United States Patent [19]

Engel et al.

[11] Patent Number: 4,747,041

[45] Date of Patent: May 24, 1988

[54] AUTOMATIC POWER CONTROL SYSTEM WHICH AUTOMATICALLY ACTIVATES AND DEACTIVATES POWER TO SELECTED PERIPHERAL DEVICES BASED UPON SYSTEM REQUIREMENT

[75] Inventors: Gary L. Engel, Wyoming; Paul J. Georgeson, Minneapolis; Douglas R. Mueller, Shoreview; John M. Quernemoen, New Brighton; Bruce C. Todd, Blaine, all of Minn.

[73] Assignee: Unisys Corporation, Blue Bell, Pa.

[21] Appl. No.: 508,296

[22] Filed: Jun. 27, 1983

[51] Int. Cl.$^4$ .......................... G06F 15/56; G06F 9/00

[52] U.S. Cl. ...................................... 364/200; 364/187; 364/492; 364/707; 340/825.06; 340/825.22; 307/29; 307/39

[58] Field of Search ............... 364/138, 144, 184, 186, 364/187, 188, 483, 492, 132, 137, 141, 200 MS File, 900 MS File, 707; 340/825.06, 825.07, 825.22, 825.31, 310 A, 310 R; 307/29, 30, 31, 38, 39, 40, 41, 140; 371/66

[56] References Cited

U.S. PATENT DOCUMENTS

| | | | |
|---|---|---|---|
| 3,535,560 | 10/1970 | Cliff | 364/200 |
| 4,204,249 | 5/1980 | Dye et al. | 364/200 |
| 4,347,575 | 8/1982 | Gurr et al. | 364/492 |
| 4,351,023 | 9/1982 | Richer | 364/187 |
| 4,357,665 | 11/1982 | Korff | 364/492 |
| 4,418,333 | 11/1983 | Schwarzbach et al. | 340/310 A |
| 4,433,249 | 2/1984 | Long | 307/31 |
| 4,437,154 | 3/1984 | Eisele et al. | 364/187 |
| 4,442,492 | 4/1984 | Karlsson et al. | 340/310 A |
| 4,453,208 | 6/1984 | Middleton et al. | 364/141 |
| 4,484,258 | 11/1984 | Miller et al. | 364/492 X |
| 4,494,207 | 1/1985 | Chang et al. | 364/184 |
| 4,521,871 | 6/1985 | Goldrim et al. | 364/187 X |
| 4,593,349 | 6/1986 | Chase et al. | 364/200 |
| 4,608,661 | 8/1986 | Sasaki | 364/900 |

FOREIGN PATENT DOCUMENTS 54-51745 4/1979 Japan .

*Primary Examiner*—Archie E. Williams, Jr.
*Assistant Examiner*—Thomas C. Lee
*Attorney, Agent, or Firm*—Charles A. Johnson; Lawrence J. Marhoefer

[57] ABSTRACT

A selective, non-manual power controller provides the selective, non-manual power control of various components of a data processing equipment from and reports the power status of such components to a central location. As opposed to pass power controllers which were limited to powering on or off all of the computer equipment controlled by a given controlling element, this invention provides a non-manual capability for remotely powering on or off any one or more components of a system or systems in a selective manner and providing the power status thereof. By being able to selectively activate or deactivate any or all of the components of a data processing system, the ability to conserve electrical energy is optimized. In many cases, a single component or a set of components are not used for extended periods of time, such as an entire production period or at least a large portion of a production period. For example, a peripheral subsystem or a particular peripheral device may be used solely for a certain type of job which is active for only a portion of a production period. Alternatively, a multiprocessor system may run as a unit processor system during evenings and weekends. The net result is a substantial saving in electrical energy that may be implemented from and reported to a central location.

4 Claims, 15 Drawing Sheets

| 0 | 1 | 2 | 3 | 4 | 5 | 6 | 7 |
|---|---|---|---|---|---|---|---|
| I/F | GROUP | | | RETURNED DATA | | | |
| I/F | GROUP | | | RETURNED DATA | | | |
| I/F | GROUP | | | RETURNED DATA | | | |
| I/F | GROUP | | | RETURNED DATA | | | |
| I/F | GROUP | | | RETURNED DATA | | | |

PACKET STOPS ON FIRST ERROR OR LAST SPECIFIED I/F GROUP

SPC Z80 MICROPROCESSOR ERROR DETECTION

| BITS | | | | | | | |
|---|---|---|---|---|---|---|---|
| 0 | 1 | 2 | 3 | 4 | 5 | 6 | 7 |
| FUNCTION (TEST OR TIME WARP) ||||||||
| I/F | GROUP ||| VARIABLE ||||
| I/F | GROUP ||| VARIABLE ||||
| I/F | GROUP ||| VARIABLE ||||
| I/F | GROUP ||| VARIABLE ||||
| I/F | GROUP ||| VARIABLE ||||
| I/F | GROUP ||| VARIABLE ||||
| I/F | GROUP ||| VARIABLE ||||

<u>I/F GROUP FIELD</u> (TEST AND TIME WARP FUNCTIONS)
 BITS 0-3 = 0-10; SELECTS ONE OF ELEVEN RELAY
  CARD I/F'S
  = 15; SELECTS SPC OPERATOR PANEL
  I/F (TEST FUNCTION ONLY)
<u>VARIABLE FIELD</u> (TEST FUNCTION)
 DATA TO BE SENT TO/RETRIEVED FROM I/F
 GROUP
 (DATA TURNAROUND TEST)
<u>VARIABLE FIELD</u> (TIME WARP FUNCTION)
 BITS 4-7 = 3; 30 SECONDS (DEFAULT VALUE)
  1-F; NUMBER OF 10 SECOND
   INTERVALS

<u>FIG. 20</u>

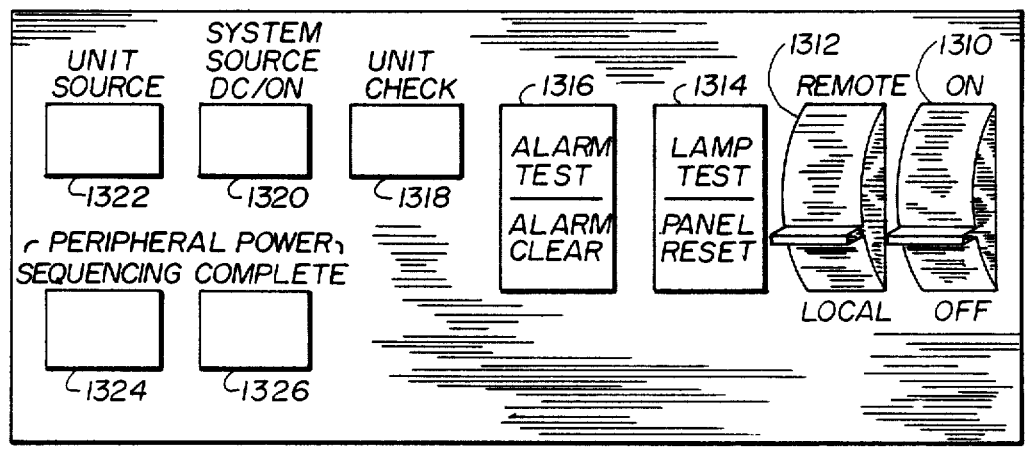

<u>FIG. 13</u>

TIME WARP FIELD
    BITS 0-3    CURRENT VALUE OF TIME WARP
STATUS FIELD
    BITS 4-7 = 0000  I/F TIMED OUT POWERING UP
                 0001  I/F POWERED UP
                 0010  I/F TIMED OUT POWERING DOWN
                 0100  I/F POWERED DOWN
                 0100  I/F NOT CONTROLLABLE
                            (LOCAL OR SHORTING PLUG)
                 1000  I/F NOT AVAILABLE (EXPANSION
                            I/F CARD NOT INSTALLED)

| 0 1 2 3 | 4 | 5 6 7 |
|---|---|---|
| I/F GROUP | SEQ. | I/F SELECT |

BITS 0-3 = 0   I/F GROUP 0
           1   I/F GROUP 1
           2   I/F GROUP 2
           ·   ·
           ·   ·
           ·   ·
          10  I/F GROUP 10
       11-15 ILLEGAL
BIT 4 = 1   SELECT SET MODE
            IF NO ADDITIONAL BYTES IN
            FUNCTION DATA FIELD, SEQUENCE
            ALL I/F'S

IF ADDITIONAL BYTES, SEQUENCE
            FROM LOWER LIMIT TO UPPER LIMIT.

= 0 BITS 0-3, 5-7 OF THIS BYTE SPECIFY
        INTERFACE
     = BITS 0-3, 5-7 OF THIS BYTE SPECIFY
        INTERFACE
BITS 5-7 = 0-5 SELECT FIPS-61 I/F
          6-7 ILLEGAL
BIT 0 IS THE MSB

FIG. 17

AUTOMATIC POWER CONTROL SYSTEM WHICH AUTOMATICALLY ACTIVATES AND DEACTIVATES POWER TO SELECTED PERIPHERAL DEVICES BASED UPON SYSTEM REQUIREMENT

BACKGROUND OF THE INVENTION

A. Field of the Invention

The present invention relates to a power controller for use with computer equipment which controller non-manually and selectively controls power to various computer equipment components from a central location. More particularly, it relates to a power controller which not only possesses this non-manual capability for remotely powering on or off any one or more components of a system or systems but which also is capable of selectively reporting via the system interface, the ON/OFF status of referenced controlled equipment. Further, it relates to a power controller which optimizes a system's ability to conserve electrical energy by turning off equipment which is not being presently used and turning on only that equipment which is presently needed.

B. Prior Art

In the past, the remote control of power to computer equipment has been limited to powering on and off all of the computer equipment controlled by a given controlling element which implemented power control either via a change in its own power status or via manual control.

One known prior art system is disclosed in U.S. Pat. No. 4,312,035, issued on January 19, 1982 to Richard E. Greene, and entitled "Apparatus for Controlling Electrical Power in a Data Processing System". In that patent, there is disclosed, an apparatus for manually controlling electrical power in a data processing system having one or more central processor units and a plurality of peripheral units, including manual switching circuitry for selectively coupling a voltage signal to each peripheral unit to cause power to be supplied thereto, and also metering means for measuring the amount of time the voltage signal is provided to each separate peripheral whereby the supply of power to any one of the peripheral units may be centrally controlled and measured. Also included is a circuit for sequentially connecting the voltage signal to the peripheral units.

Thus, the illustrated embodiment of that earlier manual system comprises:

(a) A centrally located panel of manual switches,
(b) A power interface between each switch and each entity (e.g., CPU peripheral unit) whose power is being remotely controlled,
(c) A source of power to drive interfaces and associated relays,
(d) A power interface implied at controlled entity, such interface having the capability to accept power control signals,
(e) A master switch,
(f) An enabling switch which causes the power control function (i.e., on or off) indicated by each recently touched switch to take place, and
(g) A timing mechanism which measures the amount of time elapsed since powering-on an entity was initiated.

Thus, it is readily seen that this earlier system is a manual system, whereas the present system is a much more sophisticated non-manual selective power control system that is also capable of providing power status indications of the selected controlled components to a command source.

Before proceeding with this description, it is important that certain terms are clearly understood as used in this application, the following prior art definitions are hereinafter set forth:

System

A system is a set of components with interfaces between the components connected, i.e., the hardware means of communication between the components exists. Additionally, this set of components will at least support an executive or host software and consists of the following:

(a) Processor complexes
(b) Memory
(c) I/O complexes
(d) Peripheral subsystems

Enabled Interface

The interface between two components is enabled whenever the transfer of data and control information between the components is not prohibited by component or interface hardware, or by electrical isolation. One component is considered accessible to another component if the interface between them is enabled.

Partitioning

The process of enabling and disabling component interfaces.

Application

An application is all or a subset of a systems components where:

(a) The set of components supports an executive or host software.
(b) Interfaces between the components are enabled.
(c) Any component with interfaces enabled to other components in the application is considered a part of this application. A mainframe component not in any particular application is said to be offline. A mainframe component cannot be in two applications simultaneously. A subsystem is in a particular application if it has an interface enabled to a channel of an Input/Output processor in this application.

Shared Peripheral Subsystem

A peripheral subsystem is shared if its control unit(s) has (have) interfaces enabled to different Input/Output complexes in different applications of the same or different systems.

Exclusive Use

An application is said to have exclusive use of a pheripheral subsystem when:

(a) the peripheral subsystem's interfaces are enabled only to Input/Output channel(s) in that application;
(b) the peripheral subsystems interfaces to other Input/Output channel(s) in other applications are prevented from being enabled.

Further, many peripheral subsystem control units currently being sold have a remote/local power capability. When the unit is in "local" mode, it is powered on/off at the unit. When the unit is in "remote" mode, it powers itself on/off as a result of signal levels generated by a separate controlling element. These signal levels are sent to the control unit via a standard power control interface and protocol such as that specified in the Federal Information Processing Standards (FIPS) Publication number 61, hereinafter referred to as FIPS-61.

It is presently a basic requirement that all control units sold to the government have a remote power control capability, with the standard protocol and power control interface as specified in FIPS-61. All existing control units considered "standardized" have this capability. Further, all new control units are being designed with this capability.

To further elaborate on this FIPS-61 standard, it proposes that a control unit must have a particular power control interface to the system to which the unit's data path(s) is (are) connected. Additionally, if the " . . . unit is shared between systems, then multiple power control interfaces are required (on the unit, one for each system." Thus, "unit power is brought up when the first system powers up and is dropped when the last system drops power . . . . " The term system as used in FIPS-61 appears to have the same meaning as application, defined above. However, certain systems can have more than one application, and an Input/Output Processor (IOP) is not always necessarily in the same application. Thus, the sources of power control to subsystems must be associated with IOP's rather than applications. More specifically, the IOP, or some entity uniquely associated with the IOP, must act as the "system" in the FIPS-61 sense.

The remote control of subsystem power is optional. Additionally, the large number of FIPS-61 interfaces often required under worst case conditions precludes full power within each IOP. Thus, a module or unit external to the IOP, but uniquely associated with the IOP, is required to realize adequate subsystem power control. The function of the present unit, herein called a Subsystem Power Controller (SPC), is to use FIPS-61 protocol and power control interfaces to power on/off all or a subset of the subsystems (the control units control device power) associated with a particular IOP.

When powering up subsystems, the process must be carried out in a sequential manner, i.e., two or more subsystems cannot be powering up at the same time. The control unit and devices connected to it are considered powered up when the SPC receives a FIPS-61 "power complete" signal from the control unit. Previously established with a 30 second time limit for this to occur. If this time limit was exceeded, the course of action was dependent on the SPC design. The SPC either ceased operation or continued powering on other subsystems. In both cases the error was reported; however, depending on SPC design, it was reported that either a particular subsystem did not power on, or that one or more subsystems of a specific group did not power on.

As set forth in publication (FIPS-61) the controlling element can control the power status of several controlled elements, e.g., control units. Both the controlling element and the controlled element have nominal power active at all times; this power is used only for the control of AC or DC power to the unit.

The FIPS-61 publication also states that when the controlling element activates certain signals at the power control interface to the unit, the unit will power itself on and sequentially power on any units controlled by it (e.g., the devices associated with that control unit). When the unit has completed its power-on sequence, it will activate a signal at the power control interface; this signal indicates to the controlling element that the power on operation is complete.

Conversely, the FIPS-61 standard provides that when the controlling element deactivates certain signals at the power control interface to the unit, the unit will power itself off and also power off any units controlled by it. The unit will then deactivate certain signals at the power control interface; this deactivation is an indication to the controlling element that the unit has powered itself off.

Finally, the FIPS-61 standard allows several controlling elements to control the power of a single unit. The unit will power itself on when the first controlling element activates the power-on signals; it will power itself off when all of the controlling elements have deactivated the appropriate signals.

The control of power is not limited to controlling subsystem power. Instead, any hierarchy of power control can be established, e.g., processor complex to I/O complex to subsystem. However, in the past, the control of power has been limited in the following sense: the controlling element caused all of the units it controlled to power off or to sequentially power on. Also, as described in the above reference U.S. Pat. No. 4,312,035, while selective control itself was known, such control was manual. Generally, the proposed implementation disclosed herein causes the controlling element itself to be powered on or off as it respectively causes the controlled elements associated therewith to power on or off.

As noted previously, very often a single component or a set of components are not used for extended periods of time such as for an entire production period or at least for a large portion of a production period. For example, a peripheral subsystem or a particular peripheral device may be used solely for a certain type of job which is active for only a portion of a production period. Alternatively, a multi-processor system may run as a single processor system during evenings and weekends.

It is therefore the purpose of this invention to introduce a new concept of non-manual, selective, remote power control. The controller proposed is able to selectively power off those components which will not be used for an extended period of time and to power them on when they are needed. The net result is substantial electrical energy conservation that can be implemented from a central location.

BRIEF DESCRIPTION OF THE INVENTION

In the discussion which follows, the controlling element, i.e. the component which physically controls the power status of a set of units will be called the power controller. The physical control of power is implemented via a power control interface (the FIPS-61 interface is one example) between the power controller and the unit (i.e. the controlled element). The entity that initiates the change in power status will be called the command source.

A. Object of the Invention

Accordingly, it is an object of this invention to provide a selective, non-manual, status reporting, power controller which is operable from a central location.

It is another object of this invention to provide a power controller which is universal in its operation in that it is capable of automatically controlling and reporting the power status of system(s), system components, as well as peripheral equipment.

It is a still further object of this invention to provide a power controller which accepts requests from a command source to power off or to sequentially power on those units selected by the command source.

It is also an object of this invention to provide a power controller which interprets such requests and provides activating signals at its power control interfaces to the selected units.

It is also an object of this invention to provide a power controller having one command source interface to the power controller, in which case the power controller processes the command source requests without further checking on the validity of the source of request.

It is also an object of the present invention to provide a power controller which is capable of returning signals, indicative of the power status of a controlled unit, from said controlled unit to a command source via said command source interface.

It is a further object of this invention to provide a power controller having two command source interfaces wherein only one interface is enabled at any time, and the control of enabling and disabling the interfaces is external to the power controller.

It is a still further object of the present invention to provide a power controller having several active command source interfaces to a single power controller wherein either one or all command sources can cause any unit to power on or off, or a given command source can cause power status changes of a particular unit controlled by the power controller and to report these status changes back to the command source.

It is a still further object of this invention to provide a power controller having four distinct elements:
(1) interface(s) to command source(s);
(2) power control interfaces to units;
(3) internal logic to accomodate the selective automatic signals to the power control interface; and
(4) internal logic to return signals, indicative of the status of the controlled units, to the command source.

It is also an object of this invention to provide an automatic selective remote control of computer system components which facilitates conserving electrical energy while providing the capability of controlling power from a central location.

B. Summary of the Invention

Controller apparatus is disclosed for providing the selective, non-manual control of power to computer equipment from a central location. It accomplishes this by automatically remotely powering on or off any one or more components of a system or systems. By being able to select the components which may be powered on or off its ability to conserve electrical energy is optimized. The controller apparatus accepts requests from a command source or sources to power off or sequentially power on those units selected by the command source. These requests are interpreted by the controller apparatus and activates certain signals based upon this interpretation at its power control interfaces to the appropriate units. It also provides selective reporting via the system interface of the status (ON/OFF) of a referenced controlled units.

BRIEF DESCRIPTION OF THE DRAWINGS

The foregoing objects and the above summary will be more readily understood when read in conjunction with the accompanying drawings in which:

FIG. 13 is a block diagram of the SPC operator panel.

FIG. 17 illustrates the interface select byte used to specify against which interface the function is to be performed.

FIG. 20 shows the format of the test function.

DETAILED DESCRIPTION OF THE INVENTION

Figures 1, 18:
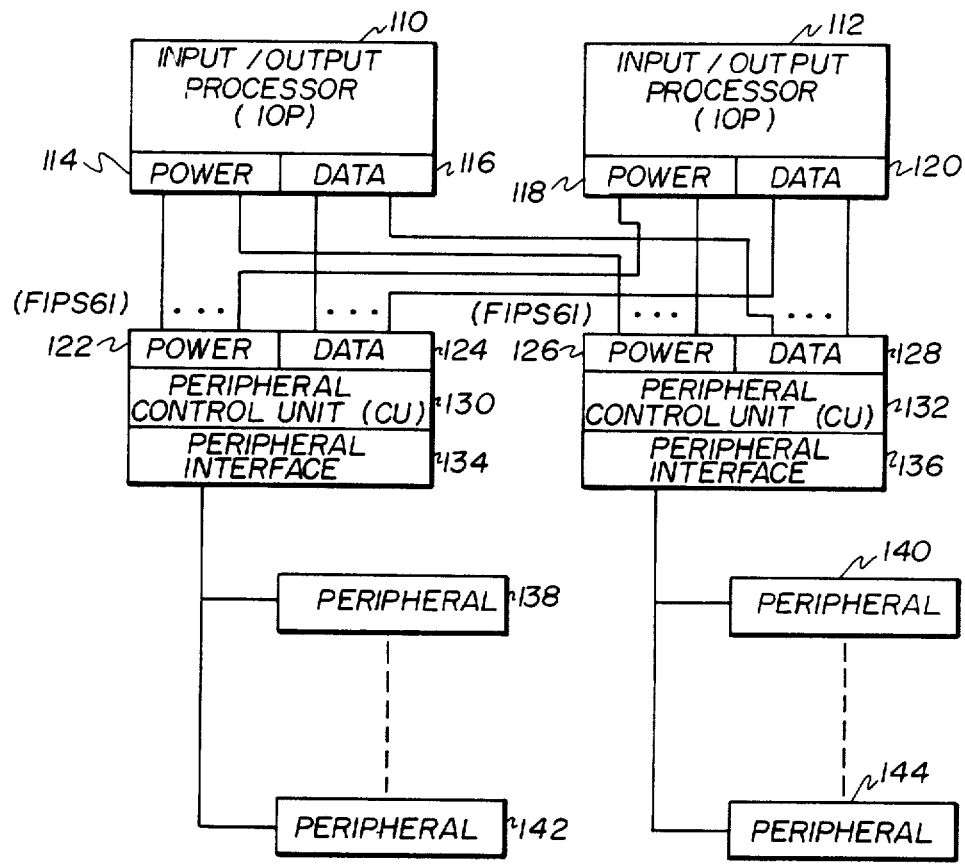
FIG. 1 is a block diagram of a portion of a data processing system illustrating a prior art system.
FIG. 18 shows the function byte executed by the SPC.

The following detailed description will be more easily comprehended when it is read in conjunction with the accompanying drawings in which like reference characters symbolize corresponding parts.

In the discussion that follows, the controlling element, i.e., the component which physically controls the power status of a set of units will be called the power controller. The physical control of power is implemented via a power control interface (the FIPS-61 interface is suggested) between the power controller and the controlled element of the peripheral unit. The entity that initiates the change in this power status will be called the command source.

For clarity of description, the power controller may be thought of as consisting of four parts:
(1) Interface(s) to command source(s);
(2) Power control interfaces to the controller elements of the peripheral units;

(3) Internal logic to receive and interpret the commands and automatically provide appropriate signals to the power control interfaces; and (4) Internal logic to determine power status of a controlled element.

In operation, the power controller accepts requests from the interfaces(s) of its command source to power off or sequentially power on those units selected by the command source. The power controller interprets these requests via its internal logic and activates signals at its power control interfaces to these units.

The present power controller is designed so that it powers on units sequentially, i.e., it waits until one unit is powered on before causing the next selected unit to be powered on. A unit signal indicating that the unit has been powered on can be used for this purpose.

The complexity of the power controller's internal logic is dependent upon the number and use of the command sources making power on/off requests to a power controller.

For example, a simple unit might have only one command source interface to the power controller. In this case, the power controller would process the request from the command source with no checking on the validity of the source of request, however, an extension to this would be two command source interfaces where only one interface is enabled at any time, and the control of enabling and disabling of the interfaces is external to the power controller.

Figures 2, 21:
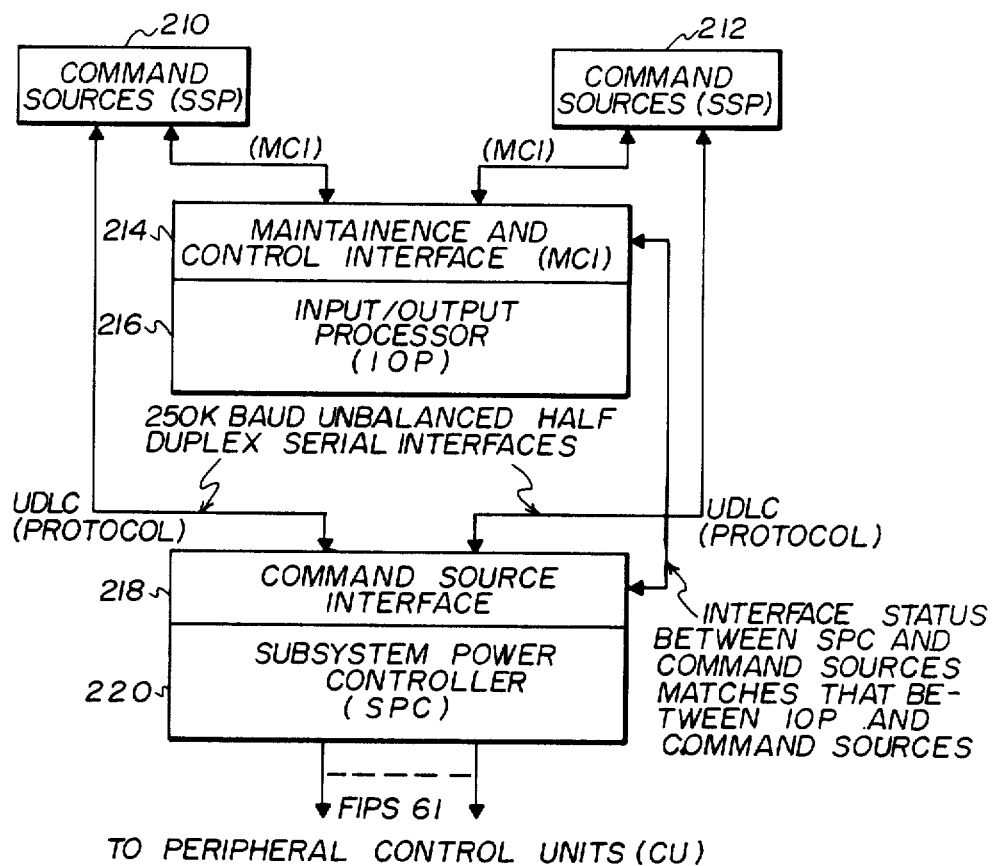
FIG. 2 is a block diagram illustrating the use of the separate subsystem power controller of the present invention.
FIG. 21 illustraates the format of the retrieved data or test response.

Referring first to FIG. 1, there is shown a system which is considered a forerunner of the present invention. Shown in FIG. 1, a pair of input/output processors 110, 112 (IOP's) are each connected to a pair of peripheral control units 130, 132 (CU's). Each of the CU's 130, 132 are, in turn, connected to a plurality of peripheral devices 138, 140, 144. It is readily seen that each of the IOP's have power interfaces 114, 118 which control the power 122, 126 to both of the CU's. In such a system, the power control system is really dispersed among the units and no centralized control is possible. To overcome this drawback, the system, as shown by FIG. 2 is suggested. Included therein is a centralized subsystem power controller 220 (SPC). Interfaces are provided to respond to a plurality of command sources or system support processors 210, 212 (SSP). Similarly, an interface is provided between each of the SSP's 210, 212 and a maintenance control interface (MCI) 214 of an IOP 216. Communication between the SSP's 210, 212 and the SPC 220 is accomplished via a 250K baud unbalanced half duplex serial and a command source interface. A plurality of FIPS-61 interfaces are provided on the SPC 220 to be individually connected to a plurality of peripheral control units (not shown).

Figure 3:
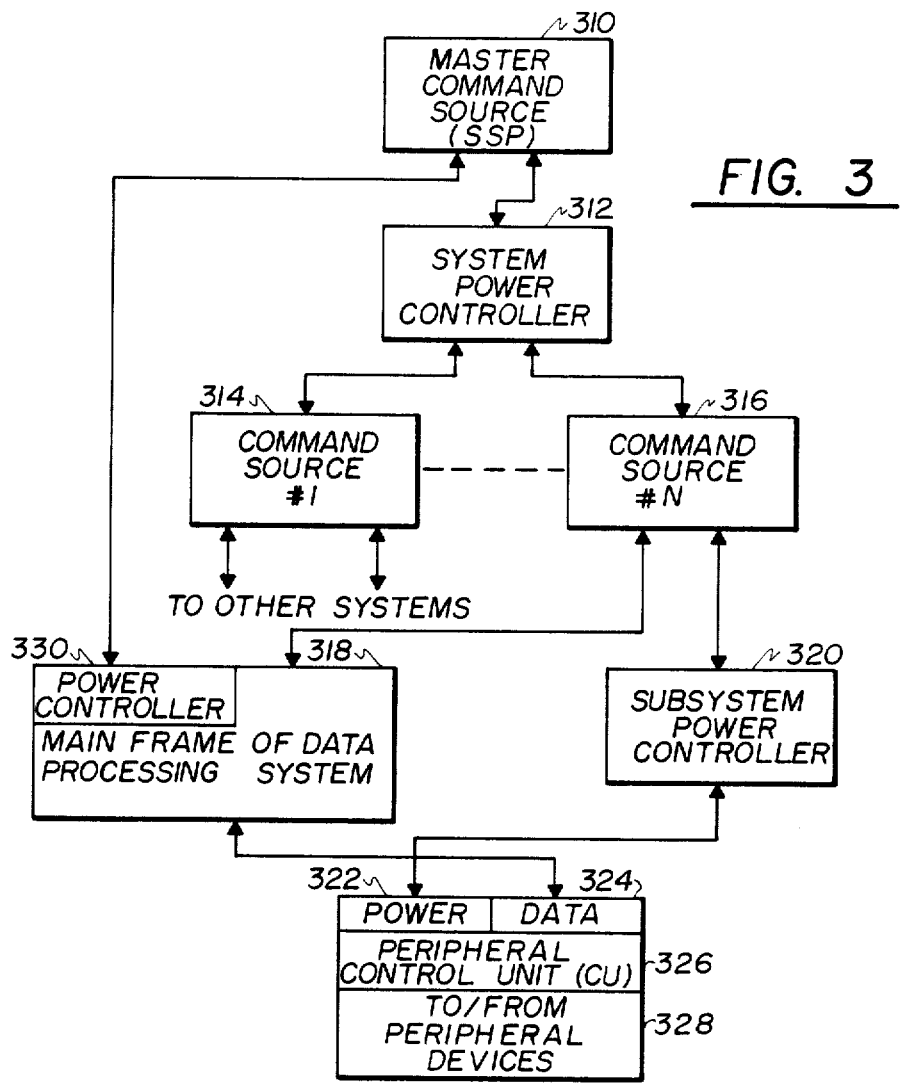
FIG. 3 is a block diagram illustrating the use of the power controller in a system configuration, in which instance it is called herein a system power controller.

FIG. 3 is a block diagram illustrative of a system application of the present invention. An overall or master command source 310 (SSP) is connected to a plurality of command sources 314, 316 (#1 to #n) via a system power controller 312. In this application, the power controller 312 performs the same function as it would in a subsystem environment. However, rather than controlling the power of one or more control units, (CU's) it operates to control the power to one or more system elements, such as SSP's. To show its system relationship, a subsystem power controller 320 is also shown connected between a CU 326, and a command source 316. A mainframe data processing system 318 with its own power controller 330 is also illustrated to show that there may be a power controller for the mainframe components. Such a controller 330 would be directed by the system or master command source 310. Naturally, the peripheral control unit 326, has a power 322 and a data 324 interface, as well as a peripheral device interface 328.

Figure 4:
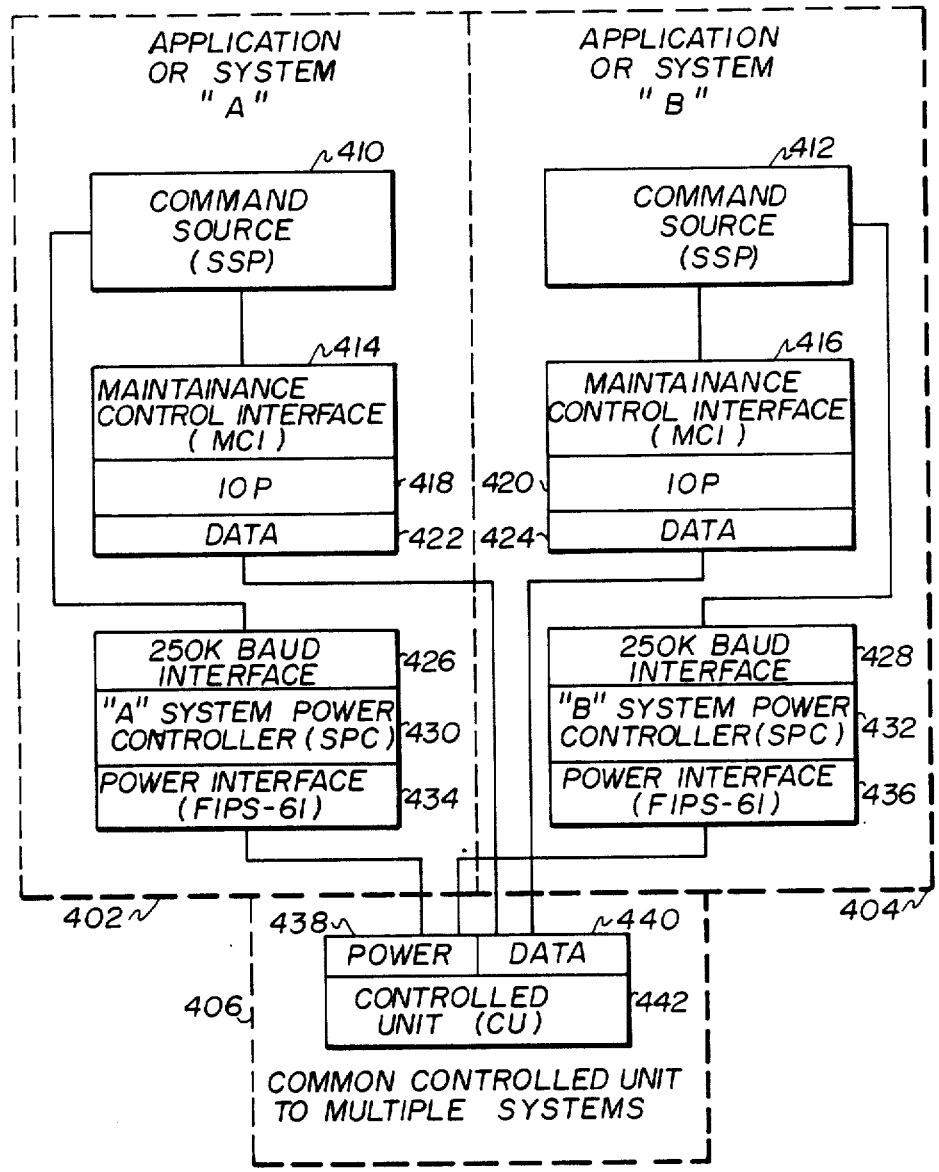
FIG. 4 is a block diagram illustrating the use of multiple subsystem power controllers wherein a single subsystem may be used in multiple systems and the power to the subsystem can be controlled by a subsystem power controller in each of the multiple systems.

Intersystem operation of a pair of power controllers is illustrated in FIG. 4. A first application or system "A" 402 and a second application or system "B" 404 share a common controlled unit 406. Each of the applications or systems is complete in and of itself. For example, system "A" has a command source 410; an input/output processor 418 with its MCI interface 414 and its data interface 422; and an SPC 430 with its 250K baud 426 and its power 434 interfaces. Similarly, the second system has a command source 412, an IOP 420, and an SPC 432.

The controlled unit 442 has a power interface 438 which is connected for common control to interfaces 434, 436 and a data interface 440 for common communication to interfaces 422 and 424 of IOP's 418 and 420.

Figure 5:
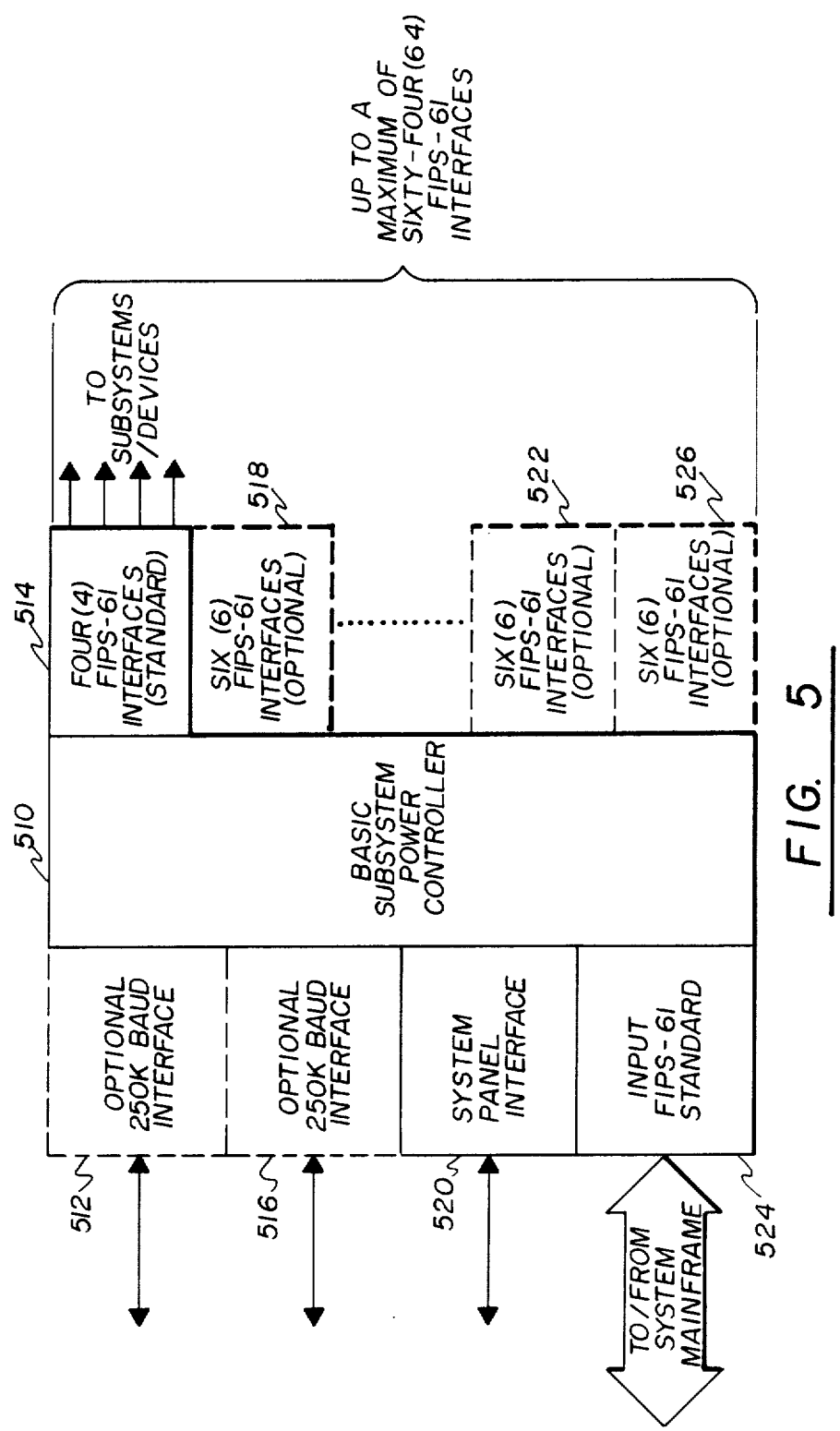
FIG. 5 is a generalized basic block diagram of a basic system power controller showing its standard and expansion capabilities.

FIG. 5 illustrates a generalized block diagram of the functions of a subsystem power controller 510 (SPC), with special emphasis on the respective interfaces. A single FIPS-61 input line 524 provides for remote power control of the SPC. A system panel interface 520 provides for power loss and environmental change alerts. The pair of 250K Baud Interfaces 512, 516 are optional. However, when present, they provide selective power control capability. A plurality of four (4) FIPS-61 interfaces 514 are used in the standard model. However, here again, groups of six (6) FIPS-61 interfaces 518, 522, 526 are optional. These additional output interfaces may be added up to a maximum of sixty-four (64) FIPS-61 interfaces.

Figure 6:
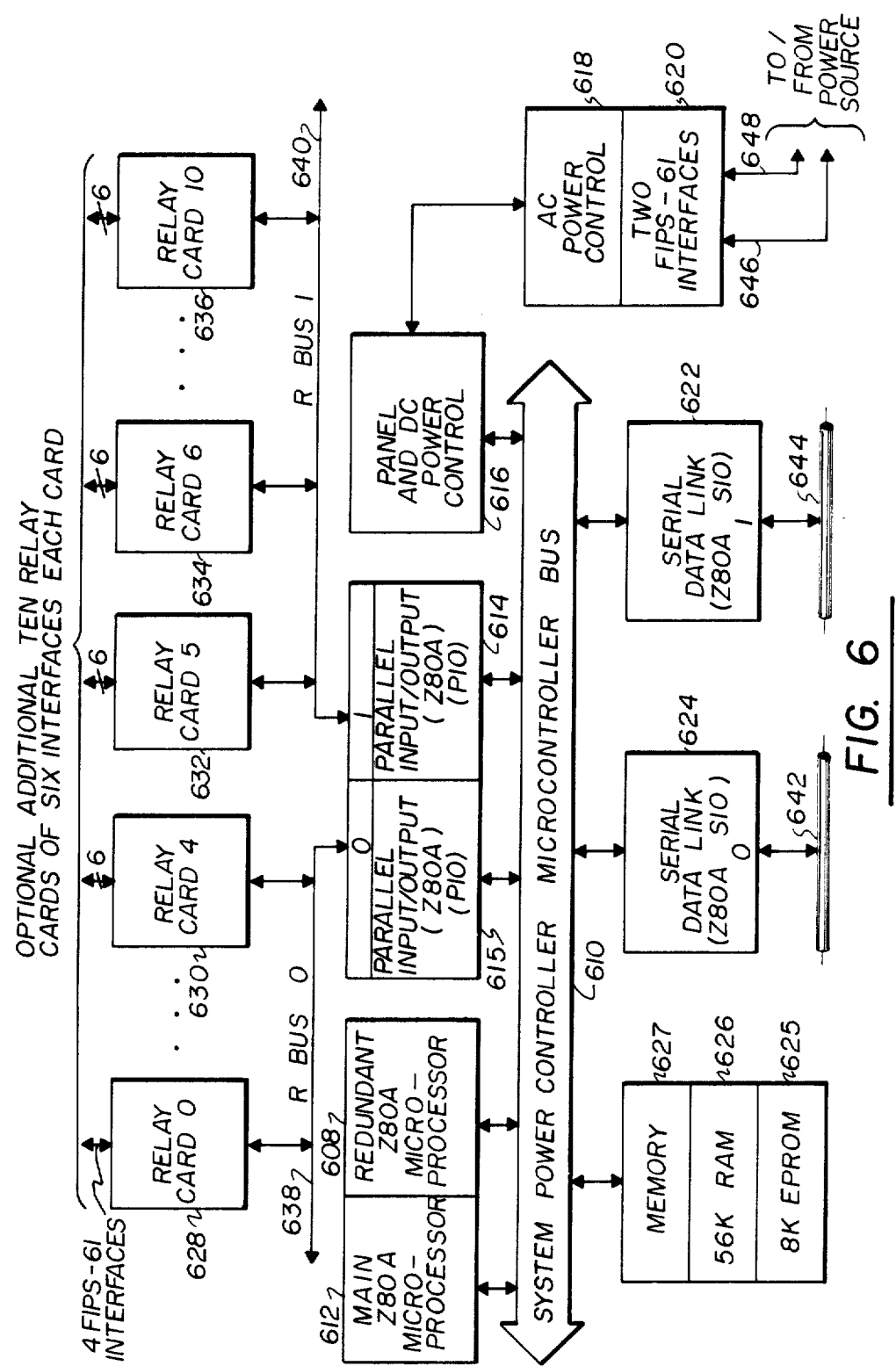
FIG. 6 is a more detailed block diagram of the same power controller showing in detail various portions of the controller.

Referring next to FIG. 6, a more detailed block diagram of the SPC is shown. A pair of microprocessors 608, 612 provide the overall control. Two are used to provide a backup or redundant microprocessor for error detection and/or correction. In order to more fully understand these devices and their environment, a few words of background may be helpful.

The term "microcomputer" has been used to describe virtually every type of small computing device designed within the last few years. It has been applied to everything from simple "microprogrammed" controllers constructed out of TTL up to low end minicomputers with a portion of the central processing unit (CPU) constructed out of TTL LSI "bit slices." However, the major impact of the LSI technology within the last few years has been with MOS LSI. With this technology, it is possible to fabricate complete and very powerful computer systems with only a few MOS LSI components.

The major reason for MOS LSI domination of the microcomputer market is the low cost of these few LSI components. For example, MOS LSI microcomputers have already replaced TTL logic in such applications as terminal controllers, peripheral device controllers, traffic signal controllers, point of sale terminals, intelligent terminals and test systems. In fact, the MOS LSI microcomputer is finding its way into almost every product that now uses electronics and it is even replacing many mechanical systems such as weight scales and automobile controls.

Microcomputer systems are extremely simple to construct using well-known components. Any such system basically consists of three parts:

(1) Microprocessor (2) Memory; and (3) Interface Circuits to peripheral devices.

The microprocessor is the heart of the system. Its function is to obtain instructions from the memory and perform the desired operations. The memory is used to contain instructions and in most cases data that is to be processed. For example, a typical instruction sequence may be to read data from a specific peripheral device, store it in a location in memory, check the parity and write it out to another peripheral device. Various general purpose I/O device controllers, and a wide range of memory devices may be used from any source. Thus, all required components can be connected together in a very simple manner with virtually no other external logic. The user's effort then becomes primarily one of software development. That is, the user can concentrate on describing his problem and translating it into a series of instructions that can be loaded into the microcomputer memory.

The components suggested for use in this controller are the ZILOG Z-80A microprocessor (CPU), the ZILOG Z-80A Serial Input/Output unit (SIO) and the ZILOG Z-80A Parallel Input/Output unit (PIO). Other similar systems may be substituted in this inventive controller without departing from the spirit of this invention.

Returning to FIG. 6, there is displayed the bus structured modular design of the SPC.

First, connected to bus 610 are the microprocessors 608, 612 which provide control of all operations performed by the SPC. Next, is the memory 627, which includes a random access memory (RAM) 626 and a read only memory (ROM) 625. In actuality, this ROM is erasable and programmable. Hence, it s also referred to in this description as an EPROM. The memory provides storage for the microcontroller's program and storage for the data generated by the microcontroller during execution of the SPC operations. The serial data links O, 624 and I, 622 provide optional communication links to a command source, via coaxial cables 642 and 644 respectively. The AC power control 618 provides local and remote control of the SPC's power. The operator panel 616 provides local control and status reporting of the SPC. The dual parallel input/output ports 614, 615 provides an interface between the SPC microcontrollers 608, 612 and two relay card buses O, 638 and I, 640 to which the relay cards 628 to 636 are connected. The relay cards 628, 630, 632, 634 and 636 provide TTL compatible FIPS-61 power control interfaces.

The SPC microcontroller 612 is based on the Z80A 8 bit microprocessor. A redundant Z80A microprocessor 608 provides a fault detection mechanism by comparing the operation of the main processor 612 with the operation of the back up processor 608. Proper implementation of this fault detection mechanism requires that both microprocessors be operated simultaneously. This simultaneous operation requires corresponding inputs to both Z80A's to be identical.

Figure 7:
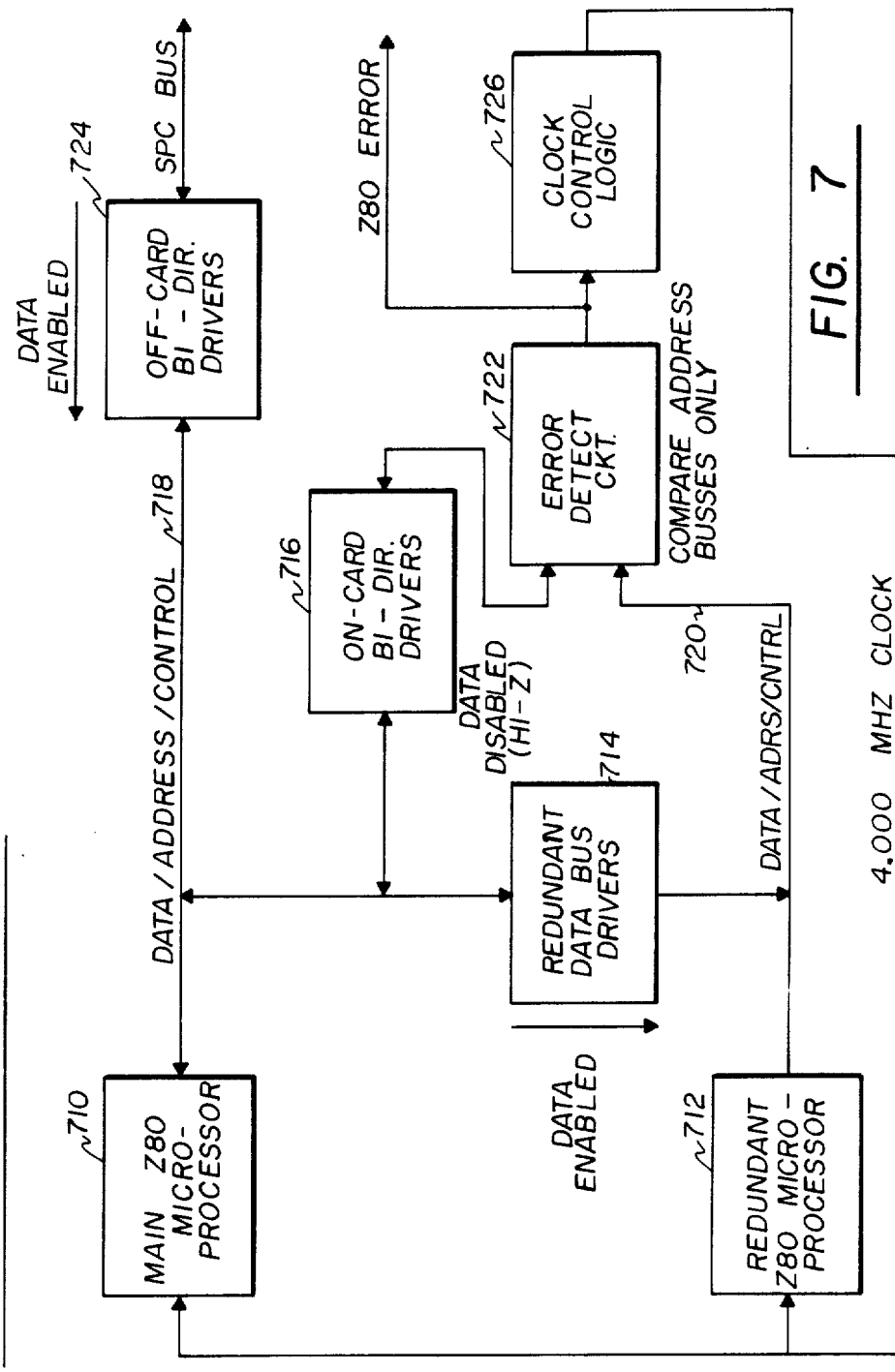
FIG. 7 is a block diagram of the SPC microcontroller illustrating an off-card read of memory or an input/output device.
Figure 8:
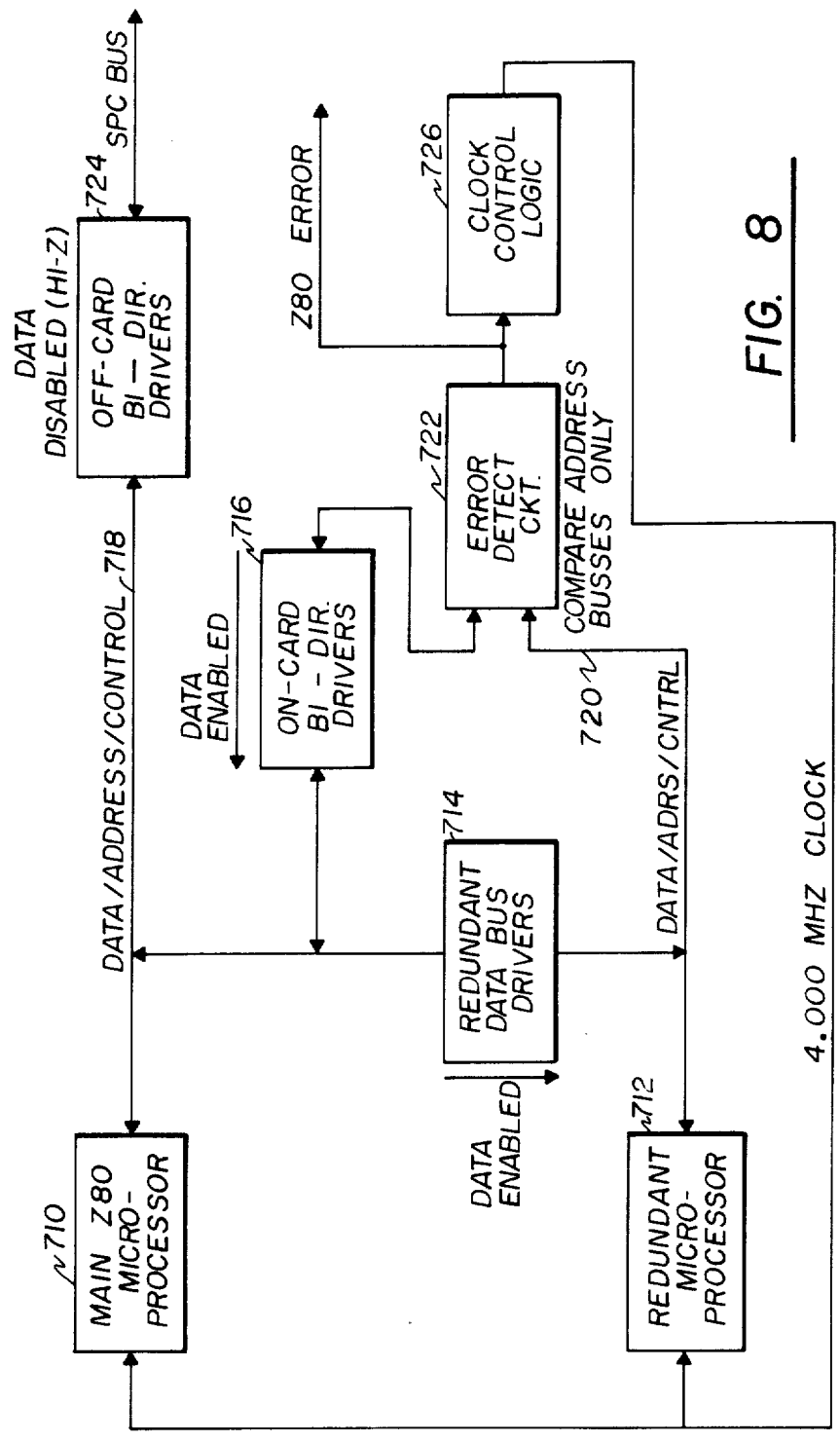
FIG. 8 is the same block diagram of the SPC microcontroller illustrating an on-card read, for example, of an error status register.
Figure 9:
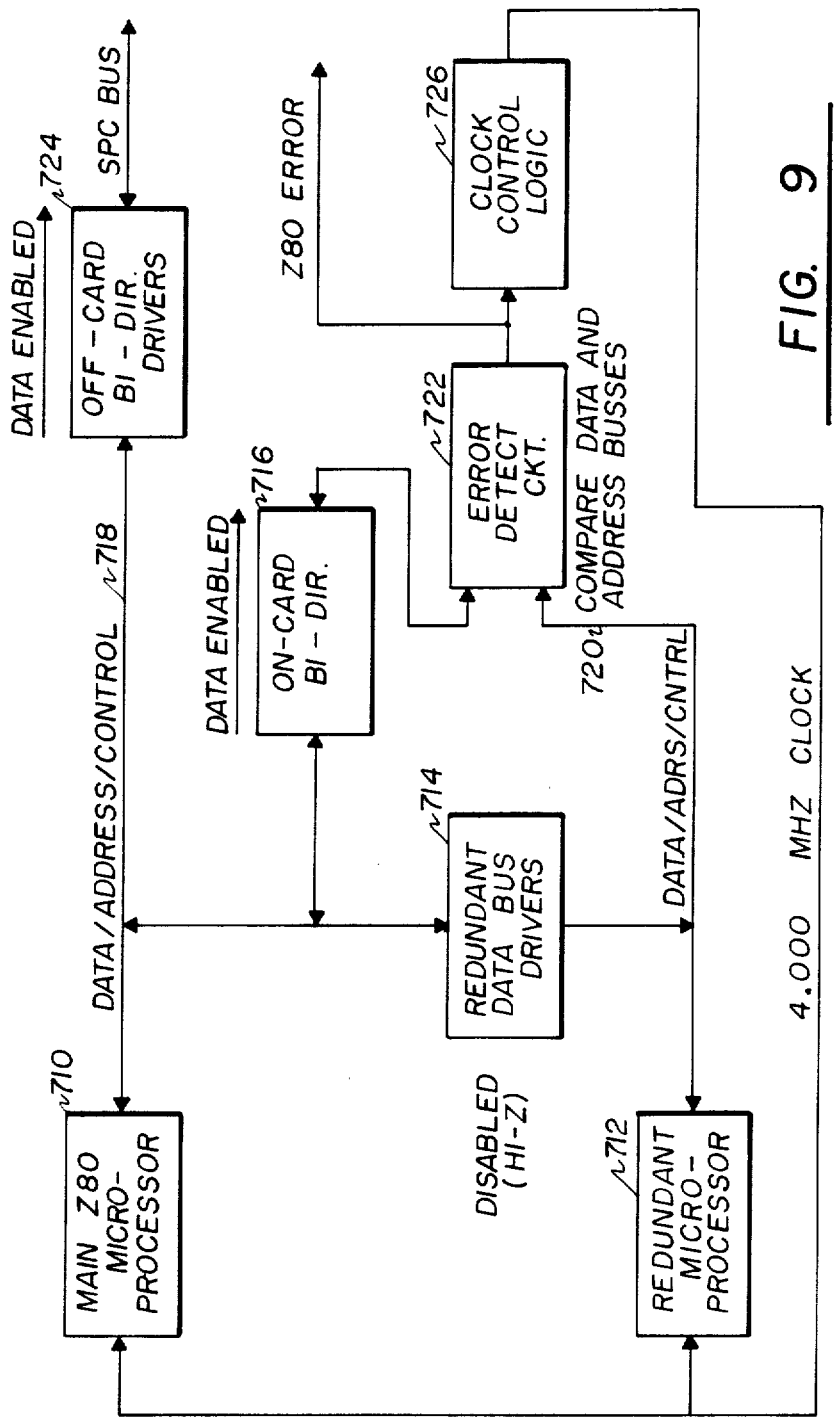
FIG. 9 is again the same block diagram of the SPC microcontroller illustrating a write operation either of the on-card or off-card variety.

All input control signals to the microprocessors are electrically connected. However, because the data bus 610 is bidirectional, electrical connections are impossible. FIGS. 7, 8 and 9 indicate the direction and enabling/disabling of the bidirectional three-state drivers (not shown, however, they are well known in the art), which drivers provide electrical isolation between the data busses of the two microprocessors.

In FIG. 7, for example, there is shown an off-card read operation. This read operation is applicable to either a memory or an I/O unit.

A main microprocessor 710 and a redundant microprocessor 712 operate on a four (4) megahertz clock signal generated by clock control logic 726. The data path is enabled via redundant data bus driver 714 and via off-card bidirectional drivers 724 in the direction of the arrow, whereas the data path is disabled via on-card bidirectional drivers 716. This disabling takes the form of a high impedance path through drivers 716. Error detection circuit 722 compares the contents of the address busses only. That is, the busses 718, 720 may carry data, addresses, or control signals, however, only the addresses are compared. A miscompare operation generates a Z80A error signal.

FIG. 8, which is basically the same logical block diagram as FIG. 7 illustrates an on-card read of the error status register. In this figure, the off-card drivers 724 become a high impedance path to thereby disable the data flow, whereas the on-card drivers 716 switch to a low impedance path to thereby enable the data along this path.

FIG. 9 is again the same SPC microcontroller block diagram as FIGS. 7 and 8, however, in this figure, the redundant data bus drivers 714 are disabled by creating a high impedance path while both on-card drivers 716 and off-card drivers 724 are data enabled. The error detection circuit 722 receives and compares both data and address busses in this configuration to provide a write operation of either the on-card or off-card variety. The error detect circuit 722 performs the comparison of the two microprocessors 710, 712. Any detected error will automatically stop the 4.000 MHZ clock of the clock control logic 726 which clock drives both processors. The circuit 722 can also be put into a fault injection mode of operation by the microprocessors, allowing the microprocessors to verify the error detection operation.

Figure 10:
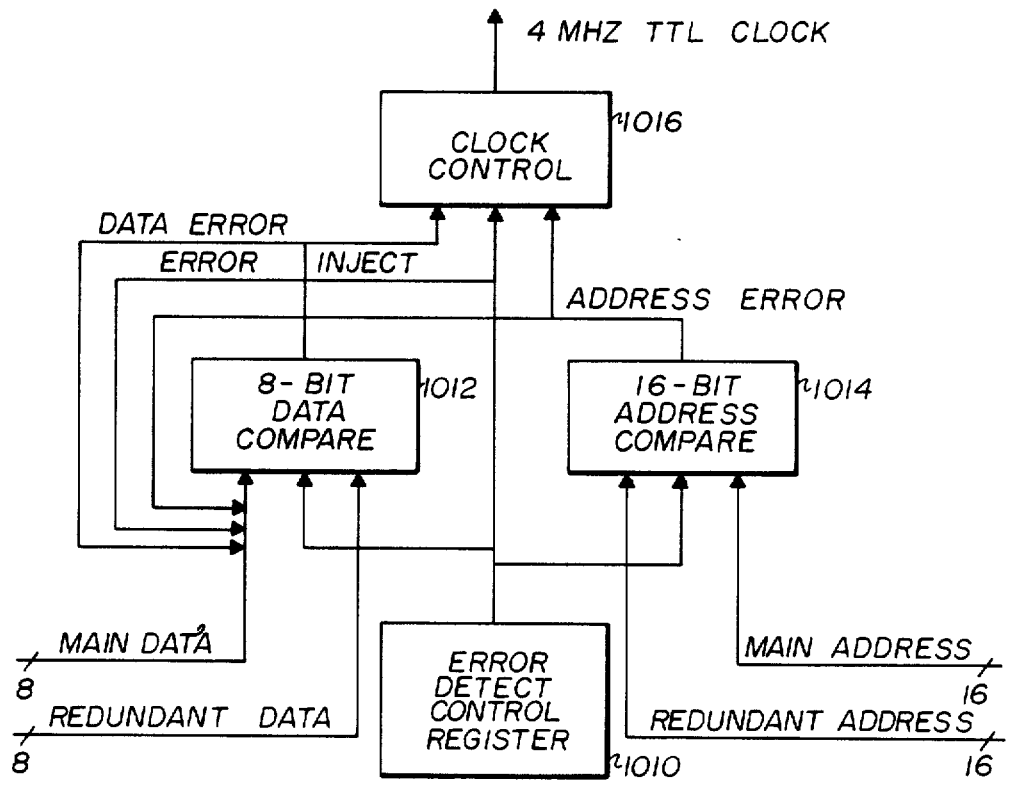
FIG. 10 is a block diagram of the SPC microprocessor (Z8oA) error detection.

This error detection operation is more clearly illustrated in FIG. 10.

In FIG. 10, the 8-bit main data and the 8-bit redundant data bus have their contents compared via data compare circuit 1012, whereas the 16-bit main address and the 16-bit redundant address bus have their contents compared via address bus compare circuit 1014.

Thus, the error detect circuit of the SPC's microcontroller compares the 8-bit data bus and 16-bit address bus of the main microprocessor, to the data and address busses of the redundant microprocessor. A detected miscompare on either bus will automatically stop the clock.

The contents of the two data busses must be equal for each write operation performed by the microprocessors. The contents of the two address busses also must be equal for each memory or I/O access (read or write). If the error detect circuit is in the inject mode, the clock will not be stopped by the injected error.

Figure 11:
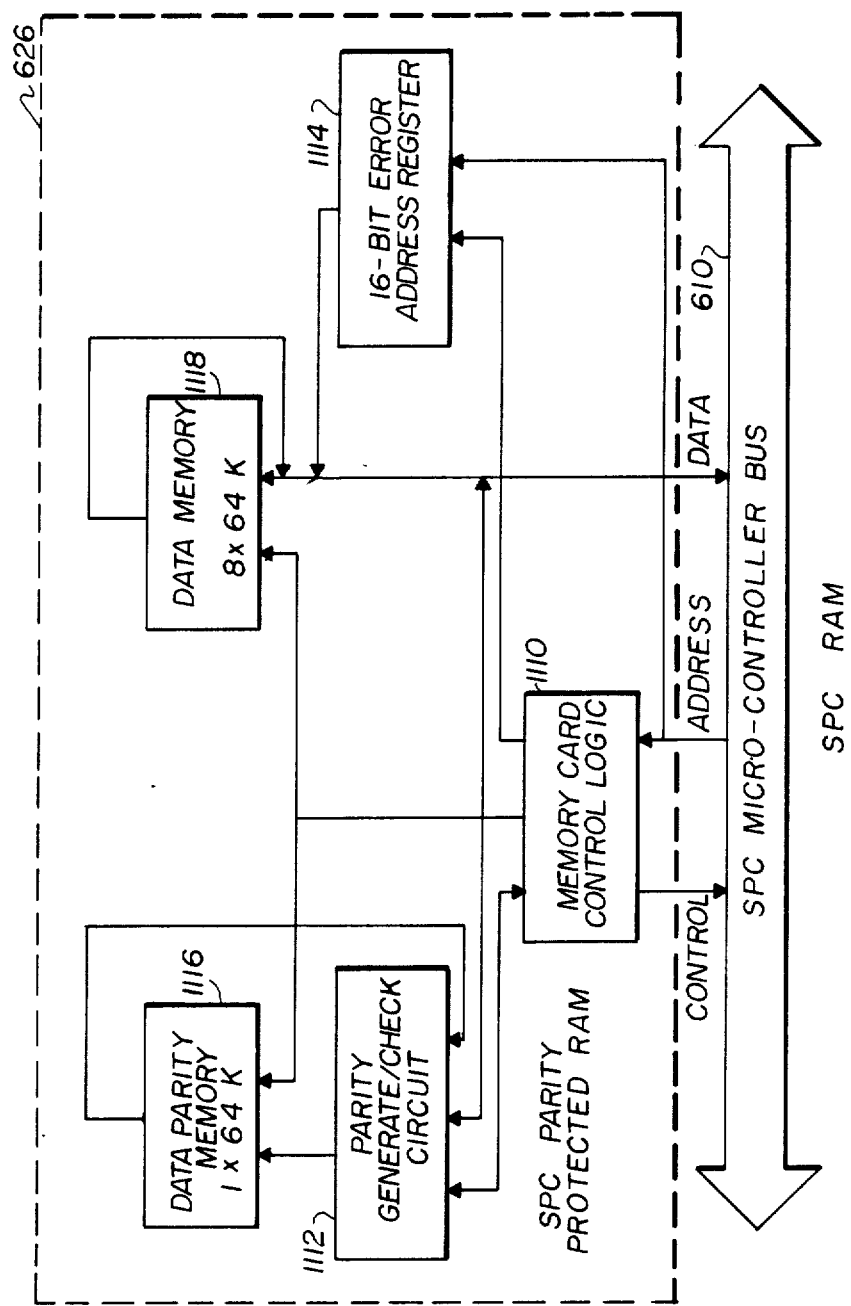
FIG. 11 is a block diagram of the SPC random access memory (RAM).

Referring to FIG. 11, there is illustrated in detail the SPC random access memory 626 shown generally in FIG. 6.

SPC data storage is provided by a 64K × 8 dynamic RAM 1118. This RAM 1118 is protected with even parity memory 1116 which is generated by hardware for each byte written, and checked by hardware for each byte read from RAM. The address of a detected parity error is latched into a register (not shown) for error reporting and recovery.

By forcing the parity generate circuit 1112 to generate erroneous bad (odd) parity, the microcontroller can verify the operation of the parity generate/check circuit 1112. A detected malfunction in the parity generate/check circuit 1112 will stop the microcontroller's clock.

Figure 12:
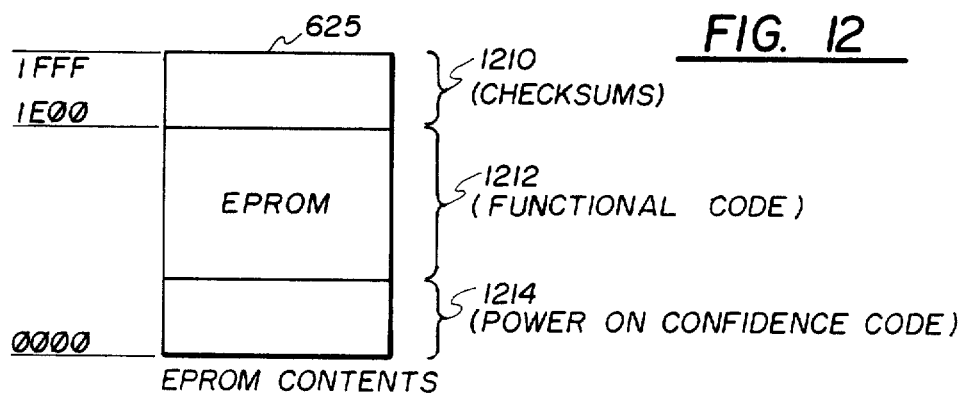
FIG. 12 is a block diagram of the SPC erasable programmable read only memory (EPROM).

FIG. 12 is a simplified block diagram showing the contents of the EPROM 625 shown generally in FIG. 6.

The SPC microcontroller's program is stored in a 8K×8-bit EPROM 625. The EPROM's contents are protected by checksum characters 1210 stored in the EPROM, and verified by the microcontroller during a Power On Confidence (POC) routine 1214 which is executed at initial Power Up of the SPC logic.

Each checksum character 1210 is the least significant 8-bits of the sum of 16 consecutive bytes in the EPROM. The 480 checksum characters are calculated on the lower 7680 bytes of EPROM, and are stored in the upper address range of the EPROM. The functional codes 1212 are also stored in the EPROM. A detected checksum error will stop the microcontroller's clock.

It should also be noted here that the contents of the EPROM are automatically copied into the RAM and are therein used for parity checking during operation of the SPC. Further, the contents of the EPROM are also used together with a failing address signal to provide an inexpensive error checking/correcting routine which may be executed from the EPROM.

FIG. 13 illustrates the SPC operator panel which provides local control and status reporting of the SPC.

The local/remote switch 1312 is a two position switch which specifies the mode of operation. The local position allows SPC power to be controlled via the SPC operator's panel, whereas the remote position allows SPC power to be controlled remotely via the FIPS-61 inputs.

The on/off switch 1310 is a momentary switch which provides power to the SPC for on and off functions if the local/remote switch 1312 is in the local position. If the local/remote switch 1312 is in the remote position, the on/off switch performs no function.

The unit source light emitting diode (LED) indicator 1322 indicates that AC power is present in the SPC cabinet.

System source DC/on LED 1320 indicates that DC power is on in the SPC cabinet.

The peripheral power indicators include (1) a sequencing LED which indicates that the attached peripherals are being powered up in sequence, when the SPC is operational in local mode; (2) a complete LED which indicates that all attached peripherals have been powered up by the SPC when it is in local mode.

The unit check LED 1318 indicates that an error in the SPC has been detected, while an audio alarm (not shown) will sound for any errors requiring manual intervention. The alarm test/clear 1316 is a push button switch which, if pushed, will cause the audio alarm to sound if it is not already doing so, whereas it will silence it, if it is already sounding. The lamp test/panel reset 1314 is also a push button switch, which if pushed will cause all LED's on the panel to illuminate. It will also clear the unit check LED 1318 if it is on and the detected error has been corrected.

Figure 14:
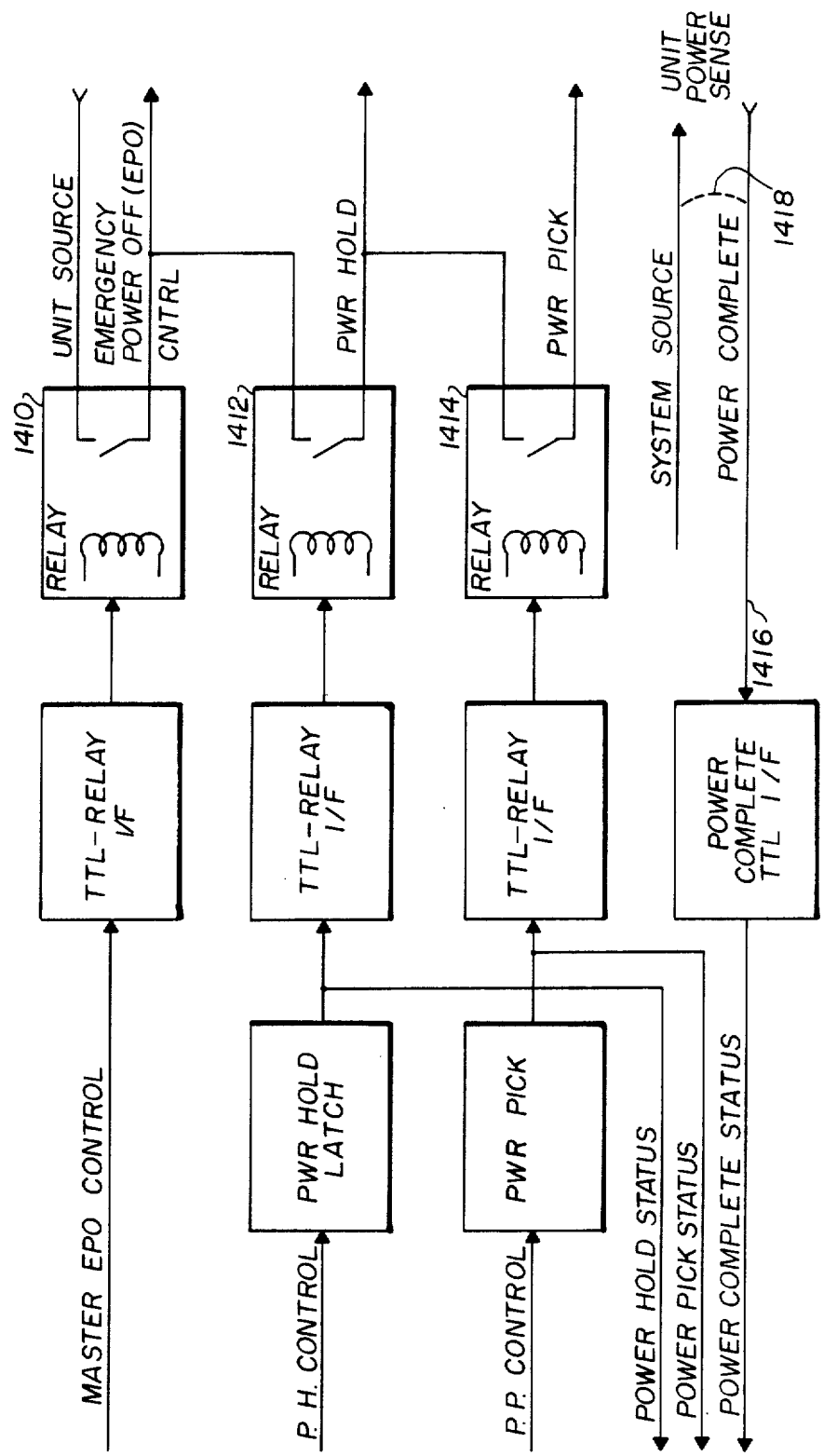
FIG. 14 shows the specific SPC implementation of a FIPS-61 interface.

As shown in FIG. 14 basic power control, using the FIPS-61 interface control, is via three switches. They are: (1) EPO switch 1410 (Emergency Power Off); (2) Power Hold switch 1412; and (3) Power Pick switch 1414. On the SPC, these switches are relays controlled by TTL flip-flops. By controlling these flip-flops via the parallel input/output (PIO) ports, the microcontroller can control the power to any attached subsystem(s) operating in remote mode.

To power up a subsystem attached to a FIPS-61 interface, the SPC must first have the EPO switch 1410 closed. Next, the Power Hold 1412 and Power Pick 1414 switches will be closed, and the microcontroller will wait until the Power Complete signal 1416 becomes active. When Power Complete goes active, the Power Pick switch 1414 will be opened, but the Power Hold switch 1412 must remain closed as along as the attached subsystem is to be powered up.

To power down an attached subsystem, the Power Hold switch 1412 will be opened. When the unit is powered down, the Powering Complete line 1416 will become inactive.

In the event of any emergency situation, all attached units can be powered down simultaneously by opening the EPO switches 1410 of all output interfaces.

The first mode of SPC operation provides sequential power control of attached subsystems. The sequence shall be set to go from FIPS-61 interface #0 to FIPS-61 interface #63. A dummy connector plug 1418 which simulates the Powering Complete signal must be installed in all unused FIPS-61 interfaces of an Interface Expansion card. Card slots of uninstalled interface expansion cards will be left open. When the power up sequence begins, the Power Sequencing LED 1324 (FIG. 13) on the operator panel will illuminate. When all attached interfaces have powered up, the Power Sequencing LED will go off, and the Power Sequencing Complete LED 1326 will illuminate.

Mode One Operation

Mode one operation requires the SPC's local/remote power control switch to be set to local. This switch setting allows the SPC to initiate the power up sequence when the SPC's on button is depressed. When operating in this mode, there is no connection between the mainframe central complex and the SPC.

Mode Two Operation

The second mode uses a FIPS-61 input interface on the SPC allowing the SPC to be connected to a central complex main-frame unit. If the SPC's local/remote switch is set to remote, and a serial data link not installed, the SPC will provide the same sequential power control as mode one, except, the sequence will be initiated when the main-frame unit initiates the power up of the SPC. If the local/remote switch is set to local, the SPC will be in mode one regardless of the FIPS-61 input interface, or the presence of a serial data link.

Mode Three Operation

Operating in remote mode and using a serial link to the central complex allows the incorporation of the command set later described. This command set provides individual FIPS-61 interface power up/power down capability and reporting of subsystem power status. To accommodate certain systems, two serial data links can be configured in the SPC to provide a redundant path to the host, or multiple paths for multiple hosts.

UDLC PROTOCOL

Figure 15:
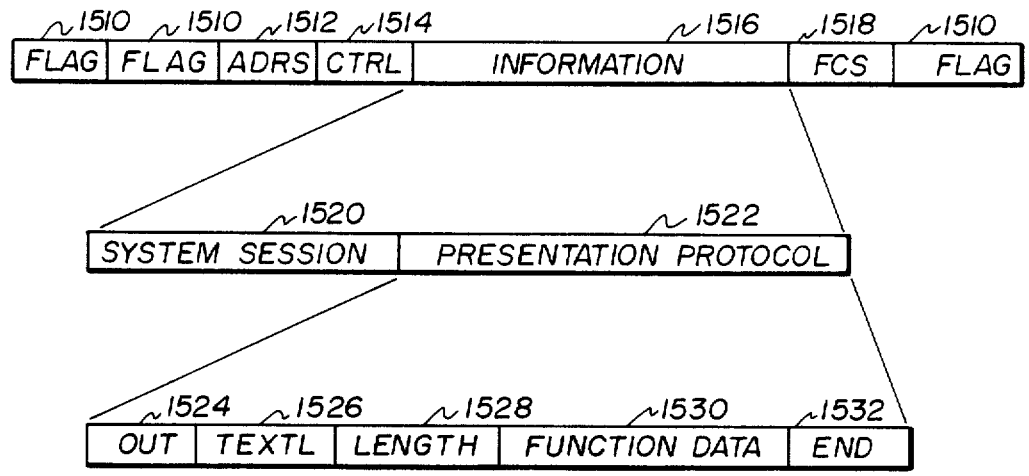
FIG. 15 illustrates the UDLC frame communication format between the host system and the system power controller (SPC).

Communication from the host system to the SPC is done via UDLC protocol. The format is shown in FIG. 15. The following example includes the architecture and protocol of one suggested implementation of a system power controller (SPC), others are, of course, possible.

Flag Field 1510

Each UDLC frame must be preceded and followed by at least one flag field 1510 of 0111 1110. Upon receipt of a flag field 1510, the SPC will expect a UDLC frame to follow. When transmitting a frame to the command source, the SPC must generate these flag fields at the beginning and end of the frame.

Address Field 1512

The second field of a UDLC frame is the address field 1512 and specifies the source/destination of the UDLC frame. The SPC will look at this field upon receipt of it to decide whether or not the rest of the UDLC frame is for it.

Control Field 1514

The UDLC Control Field controls the transfer of frames between the SPC and the command source. The Control Field of frames received by the SPC are generated by the command source. The Control Fields of frames transmitted by the SPC are generated by the SPC.

Information Field 1516

The Information Field contains all the information to be transferred under the control of the UDLC Control Field. For this particular application, the Information Field 1516 will be divided into two sections: the System Session 1520, and the Presentation Protocol 1522.

System Session 1520

The System Session part of the Information Field contains information specifying which segment of a multi-frame message is in this frame, and provides a level of data assurance allowing retransmittal of erroneous frames.

Presentation Protocol 1522

The Presentation Protocol 1522 part of the Information Field 1516 provides the "conversation" between SSP and the SPC.

The Presentation Protocol 1522 will consist of control commands, and a function data field 1530. Some of the control commands supported by the SPC are OUT 1524, TEXTL 1526, and END 1532. The function data field 1530 will contain the SPC functions sent from the system software to the SPC, and status sent from the SPC to the system software via the interface.

FCS Field 1518

The Frame Check Sequence field 1518 contains information for verifying the integrity of a frame transmission.

SPC Function Data Field 1530

Figure 16:
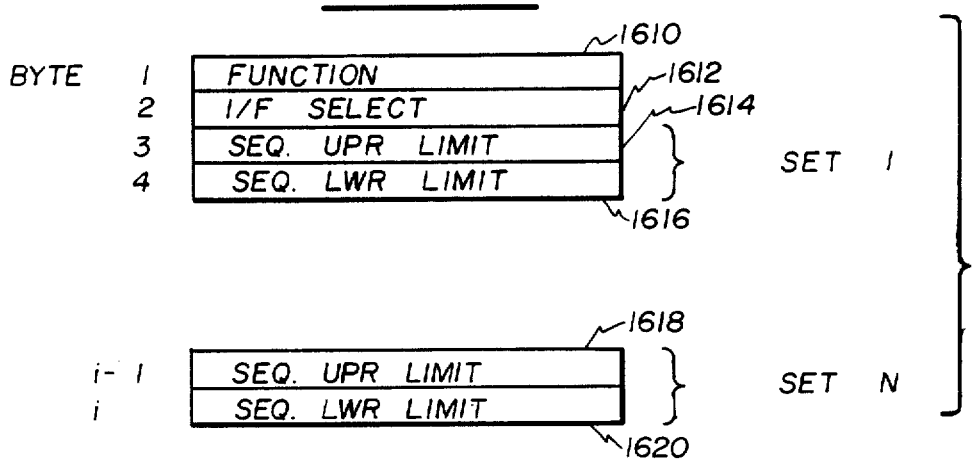
FIG. 16 illustrates the various function data fields of the SPC.

The function data field 1530 contained in the Presentation Protocol 1522 is interpreted by the SPC as indicated in FIG. 16.

I/F Select

After the function byte one 1610, the second byte 1612 of the function data field selects one FIPS-61 interface, or specifies a set mode. If the set mode is specified, up to 64 discontiguous sets of interfaces can be specified. The specifications for each set provides an upper and a lower interface select number. The SPC will start executing the function at set 1 lower limit 1616 interface, proceed sequentially until set 1 upper limit 1614 interface is reached, then restart with set 2 lower limit interface, proceeding until set N upper limit 1618 interface has been sequenced.

FIG. 17 shows the SPC interface select byte used to specify which interface the function is to be performed against and used when providing upper and lower limits for sets of sequential activities.

If bit 4 of the interface select byte shown in FIG. 17 is zero, the function will be performed on the interface specified by the rest of the select byte bits: bits 0–3 will select one of eleven possible FIPS-61 relay cards, and bits 5–7 select one of four or six interfaces on that card (Card 0 has four interfaces and cards 1–10 have six).

If bit 4 of the interface select byte is one, then the set mode is specified, and the remaining select byte bits are ignored because additional function data bytes will provide the interface selection. The additional function data bytes will be interpreted as interface select bytes and will specify the set upper and lower limits as defined above. If there are no additional function data bytes, the function will be performed on all interfaces, sequencing from interface #0 to #63.

SPC FUNCTIONS

The SPC function byte illustrated in FIG. 18 will now be described, as previously noted, this is a suggested implementation.

No-Op (00H)

The No-Op function does nothing in the SPC. No interface status is altered and remaining function data bytes are ignored. If no errors in the SPC are detected, the UDLC frame returned will have information specified in the System Session to cause the Console Control Unit (CCU) to generate a status word with Channel End and Device End set. If an error in the SPC is detected, a variant in the System Session will indicate Fail rather than Clear and the error signal will be followed by unique SPC sense bytes detailing the detected error. This System Session causes the CCU to generate status information with Channel End, Device End, and Unit Check. The Unit Check status will cause software to read the SPC sense bytes from the CCU.

Power Up ($01_{16}$)

The Power Up function will power up those interfaces specified in the interface select byte(s) previously described.

First, the SPC will return a UDLC frame with information specified in the System Session to generate Channel End status, thus freeing the CU for any other I/O. Then, the interface power status table will be checked for the availability and controllability of each interface. Next, the Power Hold and Power Pick lines of each controllable interface will be set active, and the SPC will wait for a predetermined time period for the Powering Complete line to become active. The status table will then be updated to reflect the results of this operation: either Timed Out-Powering Up, or Powered Up. This is repeated for each interface specified.

After the status table is updated, and if no errors in the SPC have been detected, a second UDLC frame will be sent by the SPC across the UDLC link. This system session causes the CCU to generate Device End status. If errors in the SPC are detected, the system session of the UDLC frame sent will contain assurance information followed by sense bytes specifying the error. This system session will result in Device End status with Unit Check set. Unit Check set will signal the software to read the sense bytes from the CCU. The SPC unique sense bytes are defined later.

Power Down ($02_{16}$)

The Power Down function will power down those interfaces specified in the interface select byte(s).

First the SPC will return a UDLC frame with information specified in the system session to generate Channel End status, thus freeing the CU for any other I/O. Then, the interface power status table will be checked for the availability and controllability of each interface. Next, the Power Hold line of each controllable interface will be set inactive, and the SPC will wait either for the Powering Complete line to drop or for the time warp to expire. The status table will then be updated to reflect the results of this operation: either Timed Out Powering Down, or Powered Down.

After the status table is updated, and if no errors in the SPC have been detected, a second UDLC frame will be sent by the SPC across the UDLC link. This system session will generate Device End status in the CCU. If errors in the SPC are detected, the system session of the UDLC frame sent will contain information followed by sense bytes specifying the error. This system session will result in Device End status with Unit Check set. Unit Check set will signal the software to read the sense bytes from the CCU.

Status ($03_{16}$)

Figure 19:
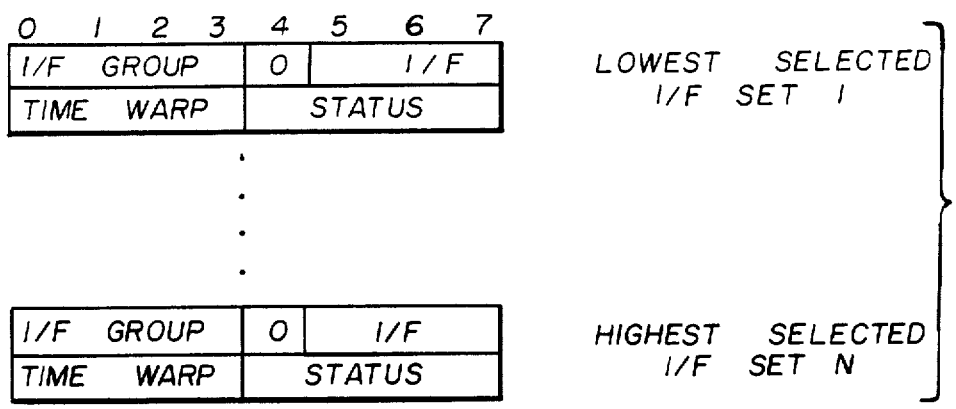
FIG. 19 illustrates the two-byte packet into which the requested status will be formatted.

The Status function will cause the SPC to return the status of the subsystems indicated by the interface select byte(s). The requested status will be formatted into two-byte packets as shown in FIG. 19 and contained in the data portion of the Presentation Protocol sent to software. If no errors in the SPC are detected, the system session of the returned frame will so indicate. This system session will generate CCU status with Channel End and Device End. If any errors are detected, this will be so indicated and the system session will also indicate error followed by SPC unique sense bytes. This system session will set Unit Check also, thus signalling software to read the SPC sense bytes from the CCU.

The status provided by this function is retrieved from a status table in the RAM 626. This table will reflect the current status of all 64 interfaces. The interface group and interface fields of FIG. 13 have the same meaning as the interface select byte. The second byte of the status packet contains a four-bit status field which reports the current status of the selected interface. The time warp field reports the current value of the time warp factor, which is discussed later.

Test ($04_{16}$)

The Test function will perform a data turnaround test of the data path across the interface between the microcontroller, and one or a sequence of expansion interface cards or between the microcontroller and panel interface. The format of the Test function is shown in FIG. 20. The programmer specifies the interface to perform the test on, and provides the data to be sent to and retrieved from the interface(s).

Upon receipt of a Test function, the SPC will return a UDLC frame with information in the system session to generate Channel End CCU status. The SPC will then perform the test on each interface specified, and format the retrieved data as shown in FIG. 21. If no errors in the SPC are detected, a UDLC frame will be sent and the retrieved data in the format of FIG. 21 contained in the Presentation Protocol. This frame will generate Device End status and transfer the retrieved data to software. If an error is detected, the system session will so indicate, followed by SPC unique sense bytes. Information in the system session will generate Device End status with Unit Check set and the Unit Check tells the software to read the sense bytes from the CCU.

The SPC is designed such that if a Test is performed on a nonexistent interface group (card not installed), the retrieved data will be 1111 regardless of what was sent. This allows the microcontroller to identify an interface as Not Available.

Time Warp ($05_{16}$)

The Time Warp function is used by the SPC to specify a time value for each interface grouping. Upon initialization, the SPC sets the time warp to a value which corresponds to 30 seconds. If the programmer wishes to have an interface group timed with a value other than 30 seconds, the time warp function can be used to specify a number between 10 and 150 seconds in multiples of 10 seconds. The SPC will not strive to achieve a time accuracy better than two seconds or 10%, whichever is greater, i.e., a time warp value for four would specify $40\pm4$ seconds on the interface grouping.

Upon receipt of a Time Warp function, the SPC will return a UDLC frame. This will generate a status word with Channel End and Device End. If any errors in the SPC are detected during execution of this function, a variant indicates Fail rather than Clear, and sense bytes detailing the error are sent in the System Session.

Illegal Functions—($06$-$FF_{16}$)

Upon receipt of any illegal function code, or any illegal parameters, the SPC will return a UDLC frame followed by sense bytes in the System Session. This will generate a status word with Channel End, Device End, and Unit Check. Unit Check will cause the software to read the sense bytes, which will specify the error.

SUBSYSTEM POWER STATUS TABLE

The status of all 64 FIPS-61 interfaces will be maintained in a status table in the RAM. The status of an interface will be based on the state of the Power Hold switch, Power Pick switch and Power Complete line of that interface. The conclusions which can be drawn from this information will be dependent on the operation which was last attempted on the interface.

The possible power control interface status and descriptions of each are provided below.

I/F Times Out Powering UP ($00_{16}$)

An interface will have this status if a Power Up function was attempted on it, and the interface's time warp expired before Powering Complete went high.

I/F Powered Up ($01_{16}$)

An interface will have this status if a Power Up function was completed successfully, i.e., Powering Complete went high before the interface's time warp expired.

I/F Timed Out Powering Down ($01_{16}$)

An interface will have this status if a Power Down function was attempted on it, and the interface's time warp expired before Powering Complete went low.

I/F Powered Down—($03_{16}$)

An interface will have this status if Powering Complete was low before any operations were attempted on it (initial SPC power up), or if a Power Down function was completed successfully, i.e., Powering Complete went low before the interface's time warp expired.

I/F Not Controllable—($04_{16}$)

An interface will have this status if Power Complete is high and both switches are open. The possible causes of this state are: (1) The unit's local/remote switch is in local. (2) There is no unit attached to this interface, but a jumper plug is installed instead, or (3) This unit is shared and is powered up by another FIPS-61 interface. If the interface is in this state after a Power Down operation is attempted, the status will be I/F Timed Out Powering Down rather than I/F Not Controllable.

I/F Not Available—(08₁₆)

This status will be assigned to all interfaces associated with a FIPS-61 Interface Expansion card which is not installed. Any unused card slots are left open. The microcontroller will be able to identify all uninstalled cards, and will assign this status to their interfaces at initial SPC power up.

STATUS PRESENTATIONS

The SPC presents status to the CCU/SSP in the System Session of a message. The possible status sent and a description of each is provided below.

(a) Assurance Unit Clear—Indicates a message was processed to completion.

(b) Assurance Unit Fail—Indicates a message was not processed to completion. Details of the encountered problem are in the accompanying SENSE bytes.

(c) Error—Indicates that SENSE data accompanies the message.

(d) Message Waiting—Indicates that the SPC has detected a problem that is unrelated to any message or command sent to it, and is detailed by the accompanying SENSE bytes.

(e) Wait—Indicates the SPC cannot respond for an extended period of time because of some ongoing operation.

SENSE Data

SENSE data is presented to the CCU/SSP, providing details of any unusual conditions detected by the SPC.

SPC SENSE Byte One

The first SENSE byte specifies what type of condition was detected.

| Sense Bit | Description |
| --- | --- |
| 0 | Command Reject |
| 1 | Equipment Check |
| 2 | Control Check |
| 3 | Undefined |
| 4 | Undefined |
| 5 | Undefined |
| 6 | Undefined |
| 7 | Undefined |

Command Reject - Indicates that the SPC has received a command which it cannot execute.
Equipment Check - Indicates that the SPC has detected a hardware malfunction within itself.
Control Check - Indicates that a FIPS-61 output interface is in an unaccountable state.

SPC SENSE Byte Two

The second SENSE byte is an extension of the first SENSE byte. The following table defines the second SENSE byte as a function of the first SENSE byte.

| Second SENSE Byte Bit # | First SENSE Byte Specifies: | | |
| --- | --- | --- | --- |
| | Command Reject | Equipment Check | Control Check |
| 0 | Unrecognizable Function Code | Relay Card- PIO Card I/F | Error With Last Operation |
| 1 | Specified I/F Group out of Range | RAM Parity Error | Detected FIPS-61 I/F State Change |
| 2 | Specified I/F Select out of Range | PIO Miscompare | SPC In LOCAL Mode |
| 3 | Zero Time Warp | Panel I/F Card Error | Undefined |
| 4 | Undefined | UDLC Error | Undefined |
| 5 | Undefined | UDLC Disabled | Undefined |
| 6 | Undefined | Undefined | Undefined |
| 7 | Undefined | Undefined | Undefined |

Command Reject
Unrecognizable Function Code - The function sent to the SPC is illegal.
Specified I/F Group out of Range - Bits 0–3 of interface select byte are an illegal value (11–15).
Specified I/F Select out of Range - Bits 5–7 of the interface select byte are an illegal value (6 or 7).
Zero Time Warp - An attempt was made to set a time warp value to zero.
Equipment Check
Relay Card - PIO Card I/F - An error has been detected in the interface between the PIO card and a relay card. The number of the faulty relay card is specified in SENSE byte three.
RAM Parity Error - Erroneous parity was detected while reading a word
for RAM.
PIO Miscompare - An error has been detected in the duplexed Z80 - PIO chips.
Panel I/F Card Error - An error has been detected in the interface between the microprocessor card and the Operator Control Panel I/F Card.
UDLC Error/Disabled - If an error is detected in a UDLC interface, UDLC Error SENSE will be returned. The SPC will retry transmission up
to eight times. After the eighth failure, the SPC microcontroller will disable the faulty UDLC link. If the second UDLC link is used, it will send UDLC Disabled SENSE bytes to bring attention to the failure.
Control Check
Error With Last Operation - A problem was encountered while performing
a command on a FIPS-61 interface. To acquire details of the problem, the status of those interfaces involved should be read via the SPC function STATUS.
DETECTED FIPS-61 I/F State Change - A FIPS-61 output interface has changed state under the control of something other than the SPC. The interface number is specified in SENSE byte three, and SENSE byte four specifies the change which occurred.
SPC in Local Mode - This will be returned over the UDLC link whenever the SPC is in local mode and receives a message or a poll.

SPC SENSE Byte Three

The third SENSE byte specifies a faulty relay card I/F or specifies a problem FIPS-61 I/F. When sent with Equipment Check and Relay Card PIO Card I/F, the format is:

| 0 1 2 3 | 4 | 5 | 6 | 7 |
| --- | --- | --- | --- | --- |
| I/F GROUP | 0 | 0 | 0 | 0 |

Bits 0–3 = 0 I/F Group 0
1 I/F Group 1
2 I/F Group 2
.
.
10 I/F Group 10
11–15 Not Used When sent with Control Check and Detected FIPS-61 I/F State Change, bits 0–3 have the same meaning as above, but bits 4–7 will specify the interface of that group which has changed state.

SPC SENSE Byte Four

The fourth SENSE byte is used only with Control Check and Detected FIPS-61 I/F State Change. Bits 0-3 specify the previous state, and bits 4-7 specify the new state. The codes are the same as those used in the SPC status packet (FIG. 19).

To summarize, what has been shown and described is a selective, non-manual system for the control of power to computer equipment from and to provide power status information to a central location. In prior applications, the remote control of power to past computer equipment has been limited to powering on or off all of the computer equipment controlled by a given controlling element which implemented power control either via a change in its own power status or via manual control. The uniqueness of the present invention is its ability to provide a non-manual capability for remotely powering on or off one or more selected components of a system or of multiple systems. It will be understood from the foregoing description that various modifications and changes could be made in the preferred embodiment of the present invention without departing from its true spirit.

It is therefore intended that the foregoing description of the preferred embodiment is for purposes of illustration only and should not be construed in a limiting sense. The scope of this invention should be limited only by the language of the claims which follow the attached appendix of System Power Controller flowcharts.

APPENDIX

MICROCODE FLOW CHARTS

TABLE OF CONTENTS

APPENDIX FIGURES

| Figure | Name | Page |
|---|---|---|
| Figure 0-1. | POC-MAIN | A0C |
| Figure 0-2. | POC-RAM | A01 |
| Figure 0-3. | POC-RAMB | A02 |
| Figure 0-4. | POC-PIO | A03 |
| Figure 0-5. | POC-RLY | A04 |
| Figure 0-6. | INIT | A05 |
| Figure 0-7. | IDLOOP | A06 |
| Figure 0-8. | FIPIF | A07 |
| Figure 0-9. | PNL | A08 |
| Figure 0-10. | RELAY | A09 |
| Figure 0-11. | TWINT | A10 |
| Figure 0-12. | LAMP TEST/RESET NMI | A10 |
| Figure 0-13. | FIPS-61 OFF NMI | A10 |
| Figure 0-14. | LOCAL OFF NMI | A11 |
| Figure 0-15. | AIR LOSS NMI | A11 |
| Figure 0-16. | HIGH TEMP NMI | A11 |
| Figure 0-17. | OVER TEMP NMI | A12 |
| Figure 0-18. | PIO ERROR NMI | A13 |
| Figure 0-19. | PARITY ERROR NMI | A14 |
| Figure 0-20. | NMI SERVICE ROUTINE | A15 |
| Figure 0-21. | FNCDEC | A16 |
| Figure 0-22. | FNCDEC | A17 |
| Figure 0-23. | FNCDEC | A18 |
| Figure 0-24. | FNCDEC | A19 |
| Figure 0-25. | FNCDEC | A20 |
| Figure 0-26. | PWRUD | A21 |
| Figure 0-27. | STATUS | A22 |
| Figure 0-28. | TMWRP | A23 |
| Figure 0-29. | TEST | A24 |
| Figure 0-30. | SENSCK | A25 |

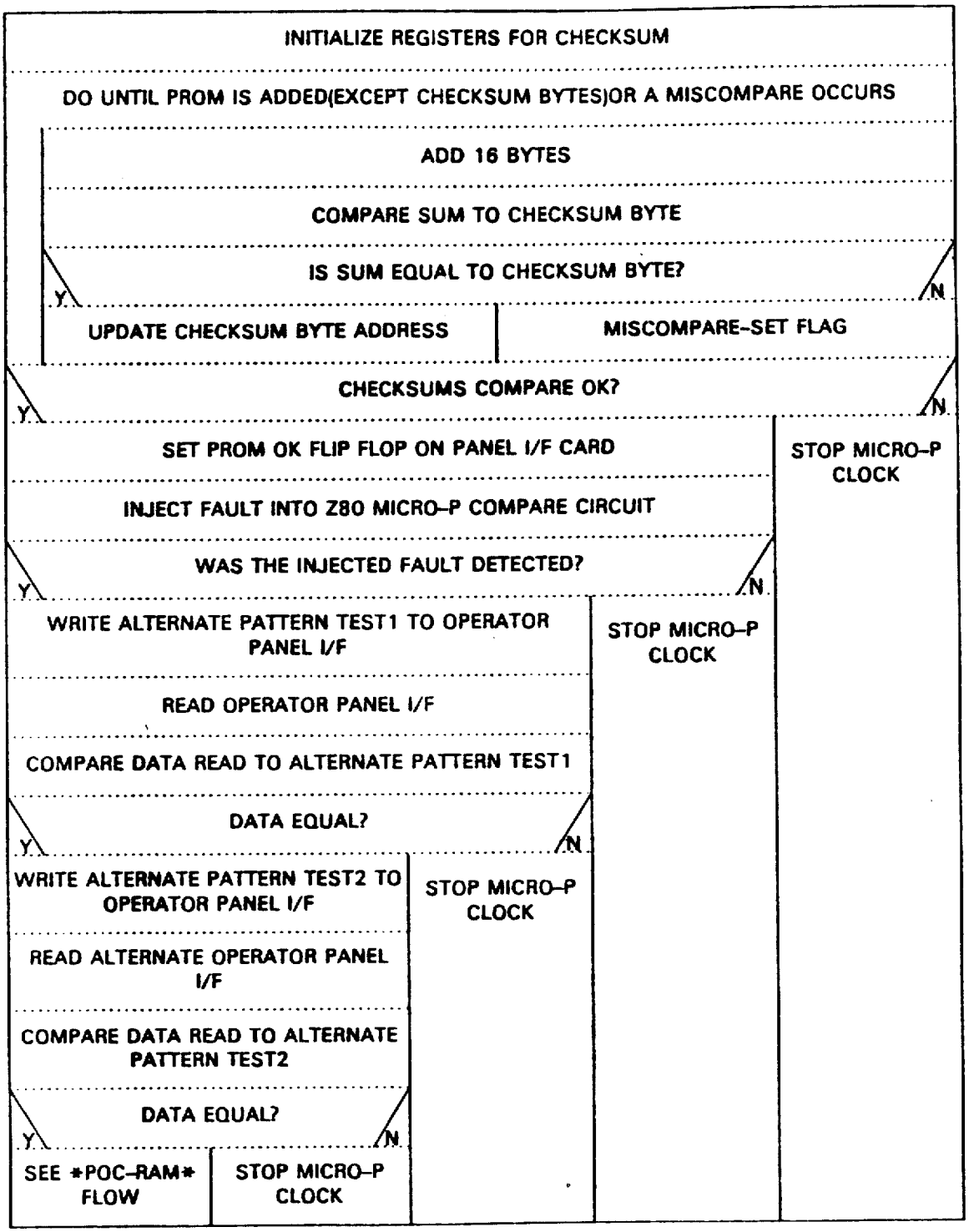
Figure O-1. POC-MAIN

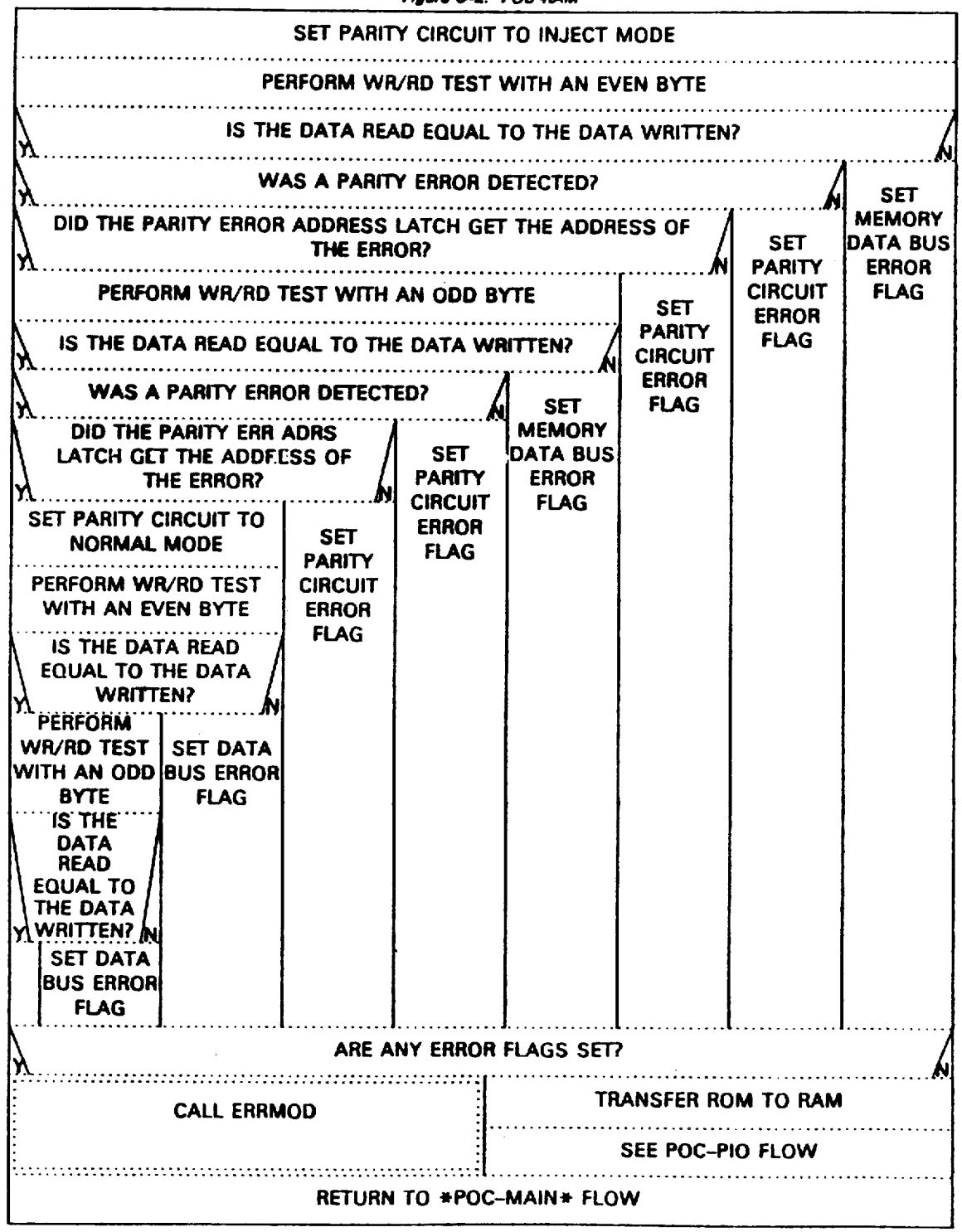
Figure O-2. POC-RAM

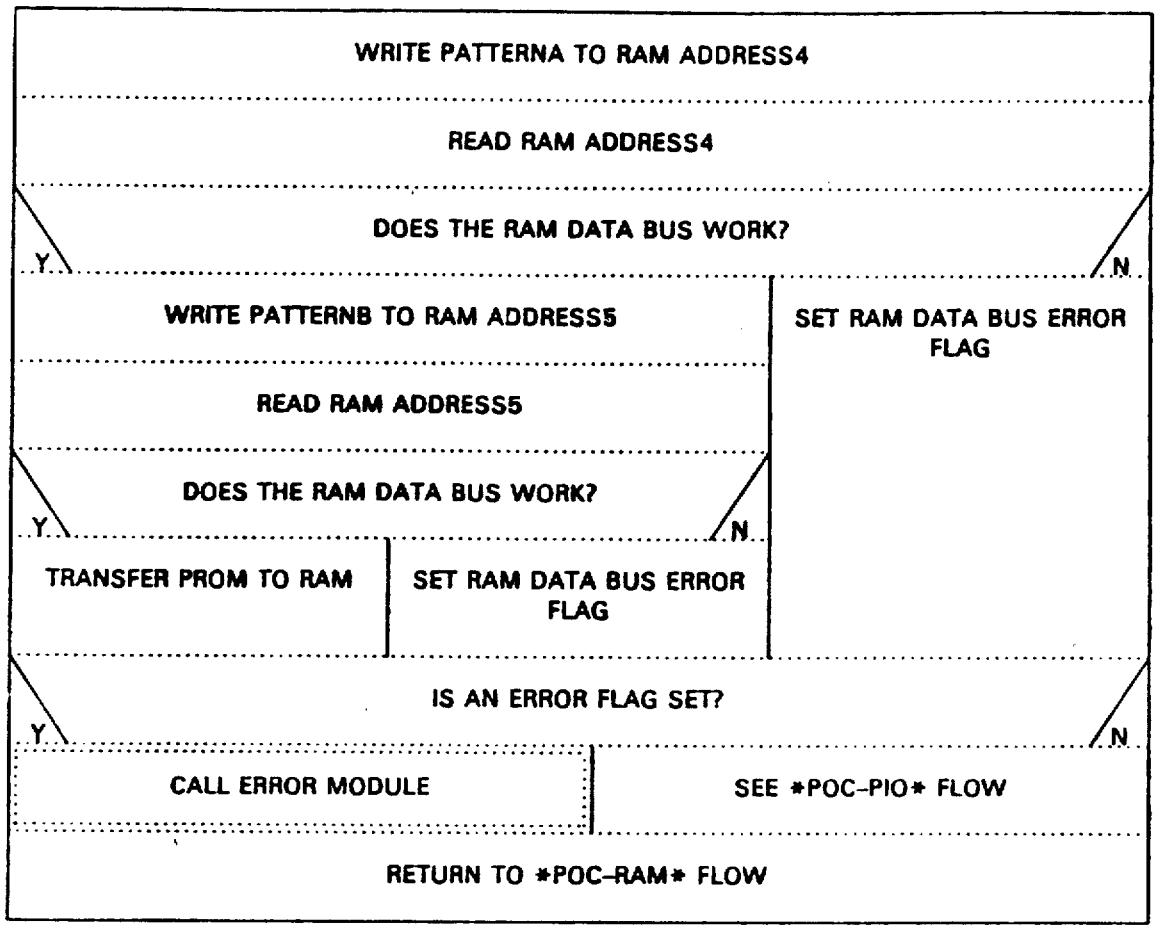
Figure O-3. POC-RAMB

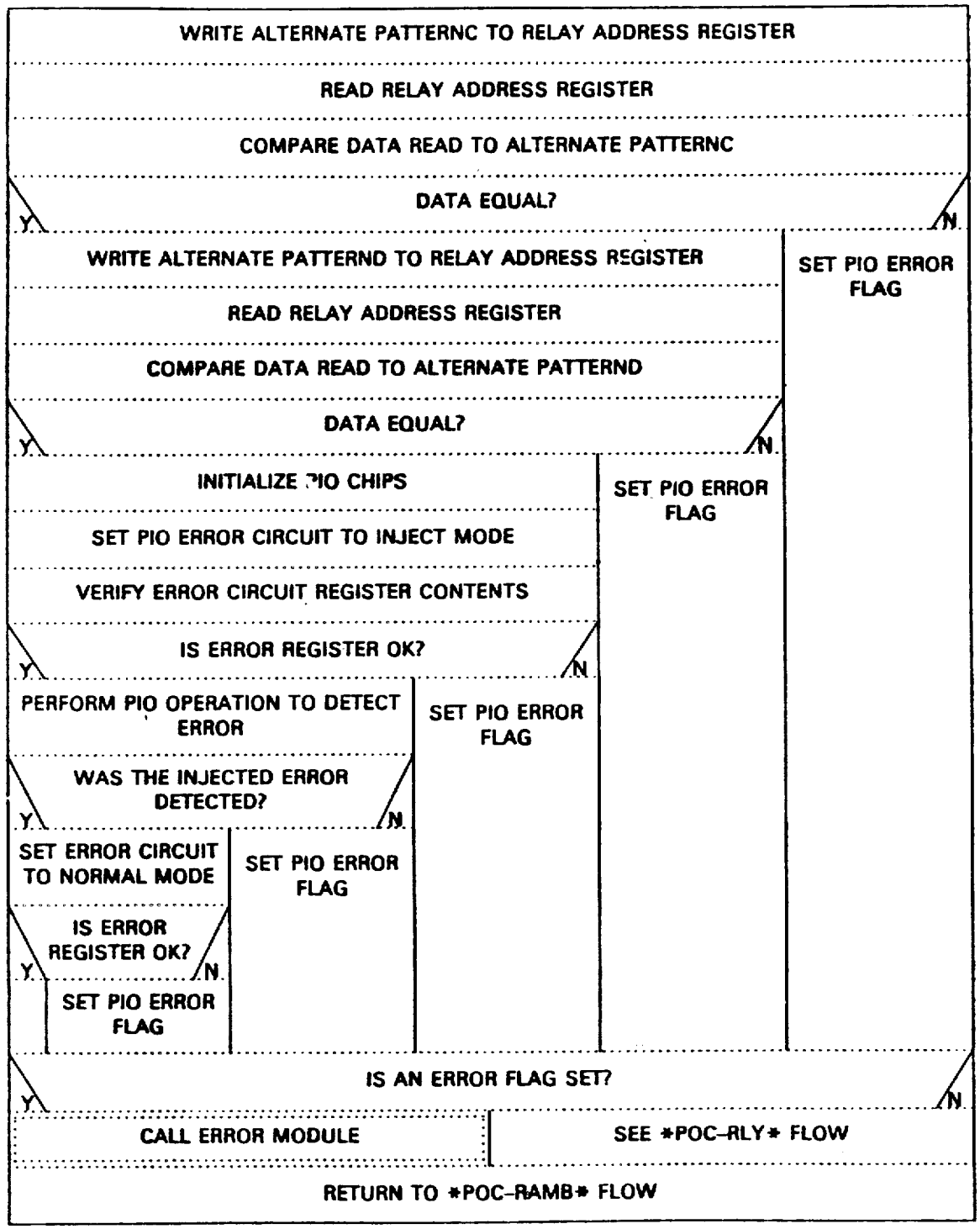
Figure O-4. POC-PIO

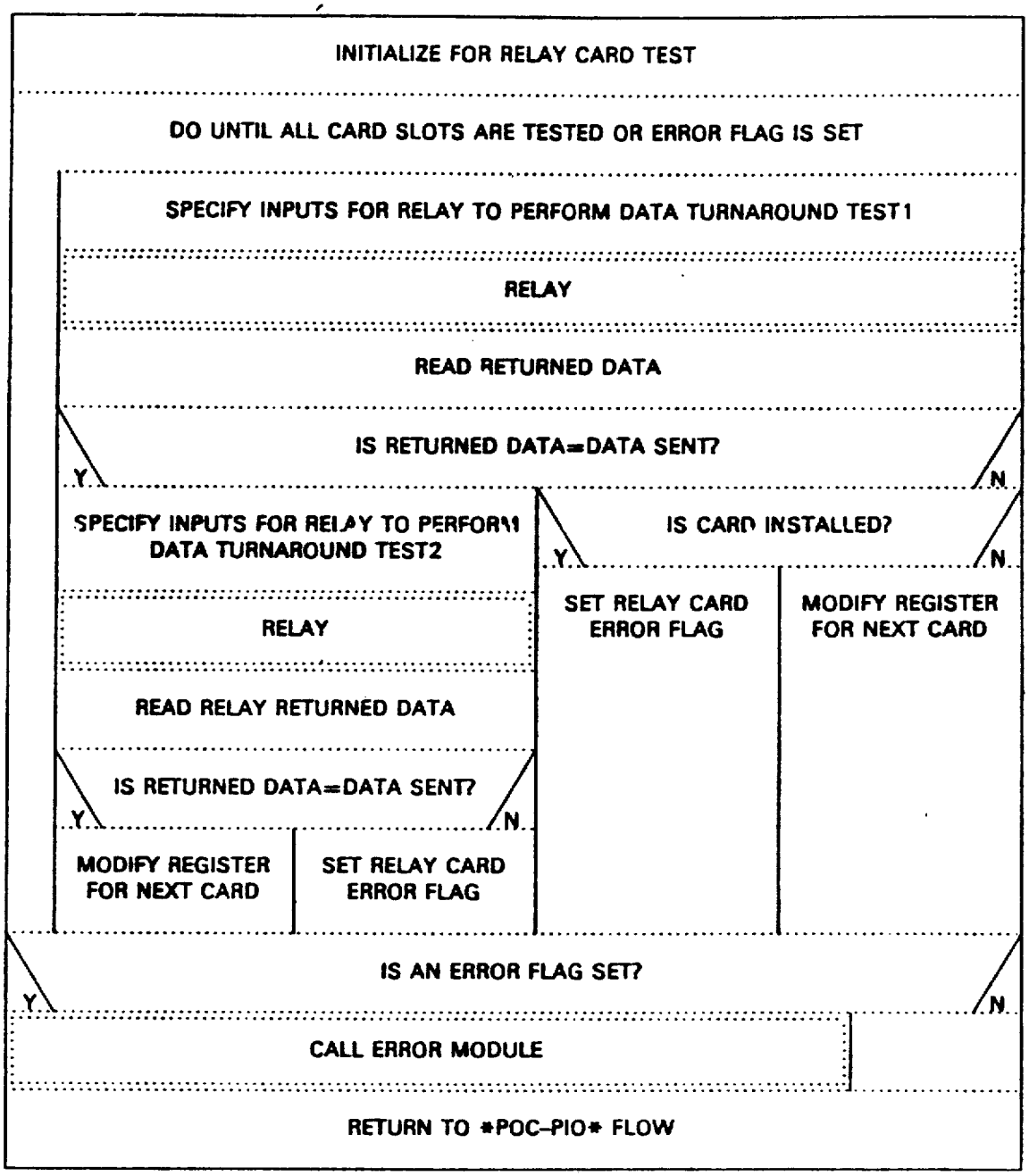
Figure O-5. POC-RLY

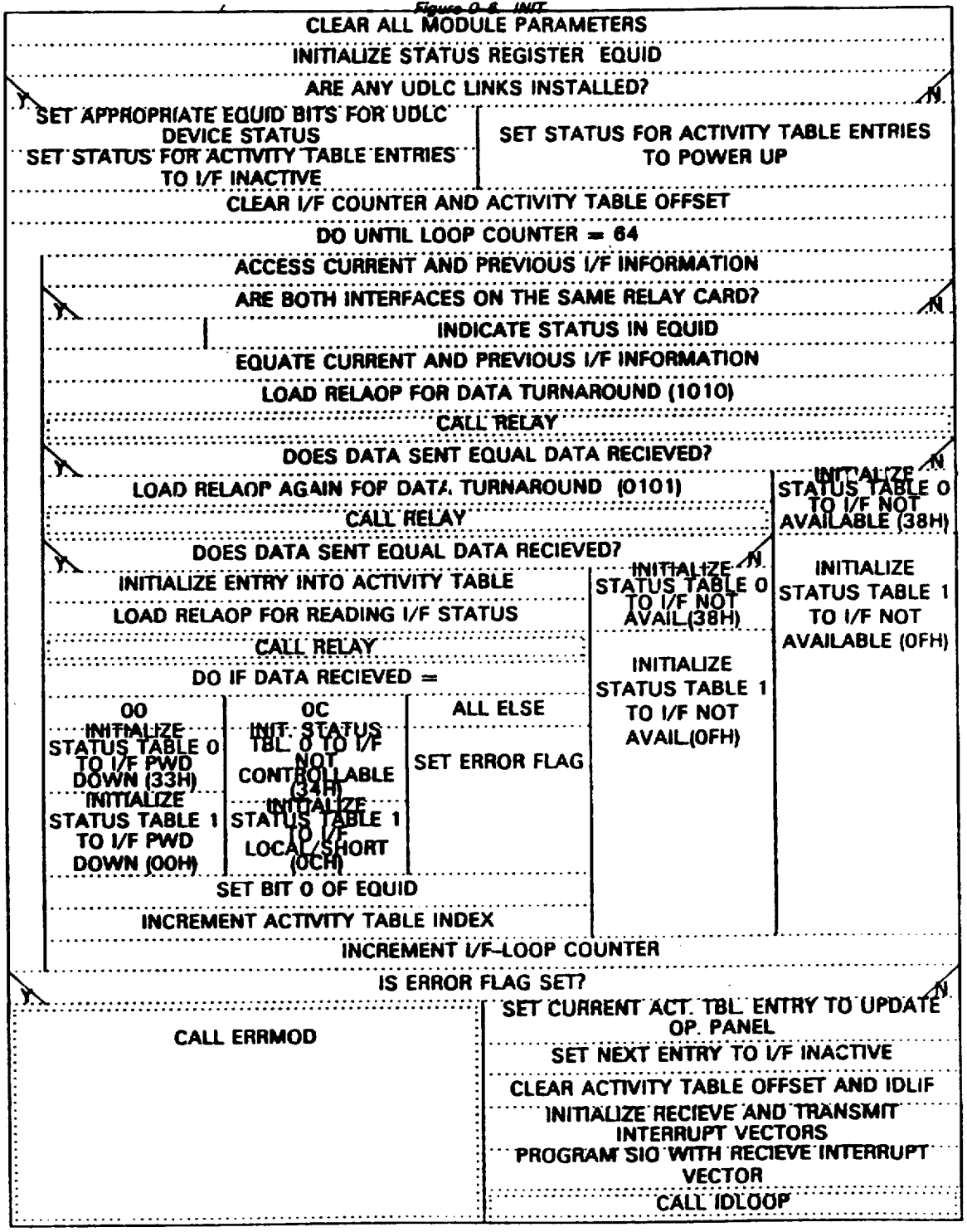
Figure 0-8 INIT

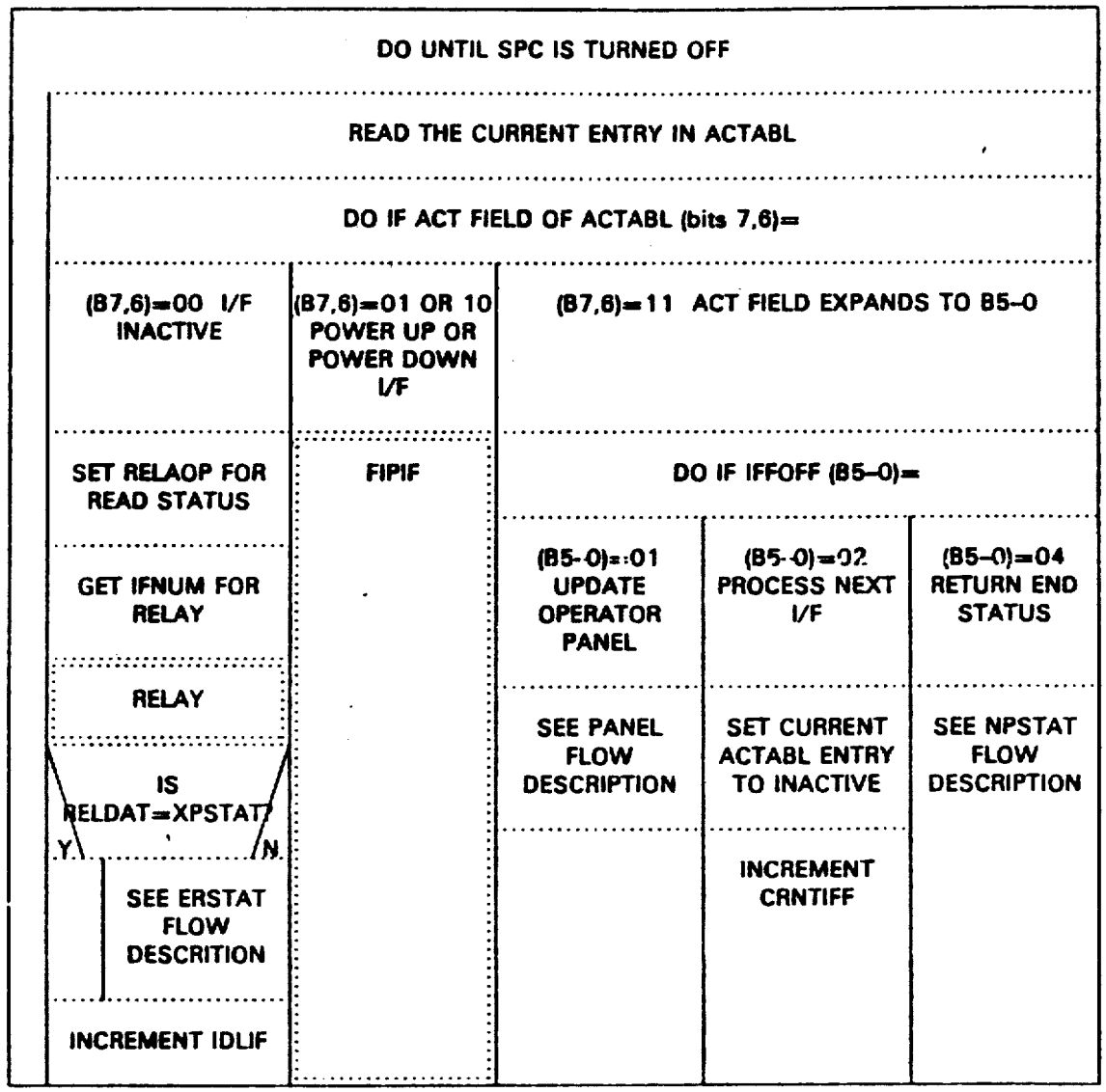
Figure O-7. IDLOOP

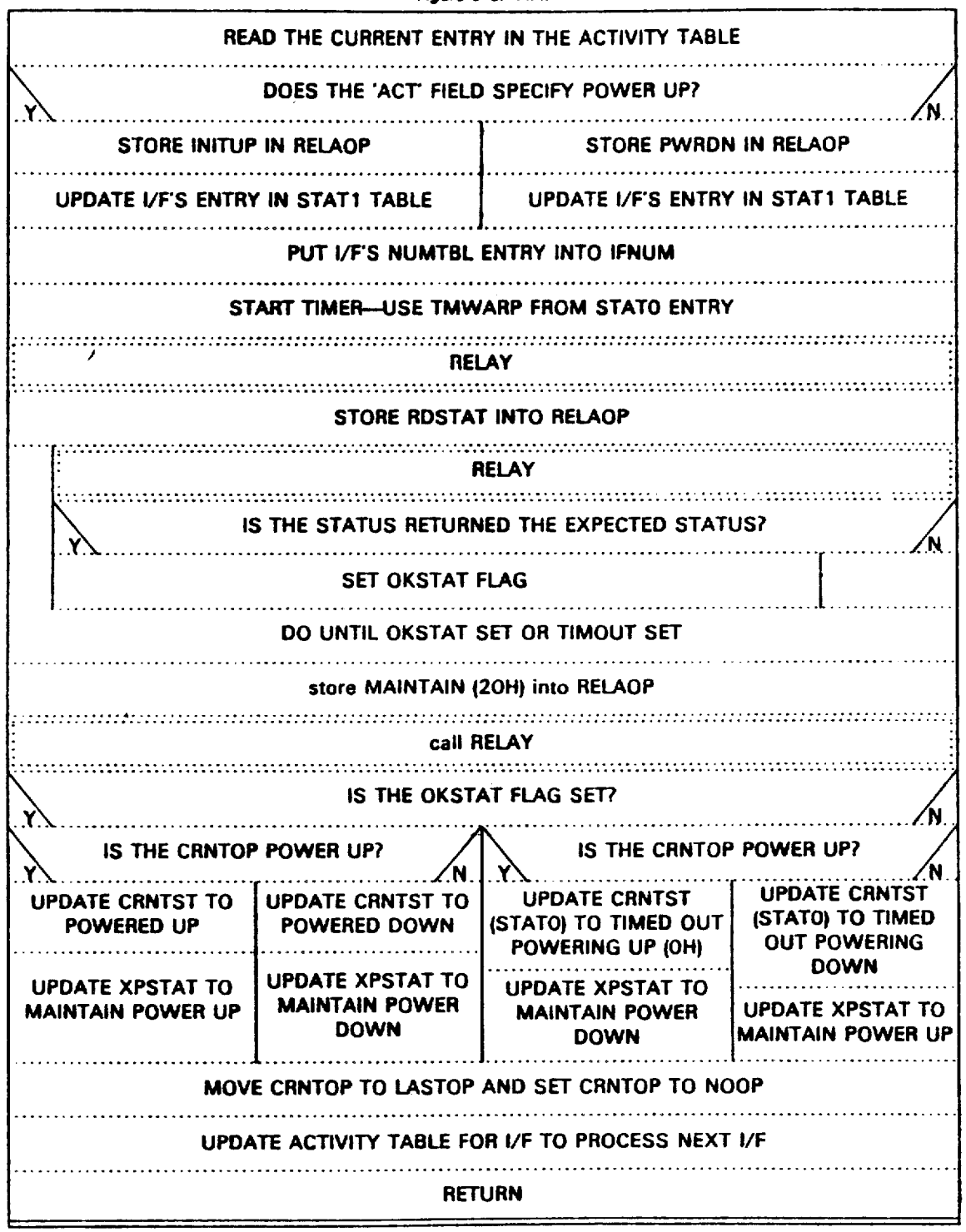
Figure O-8. FIPIF

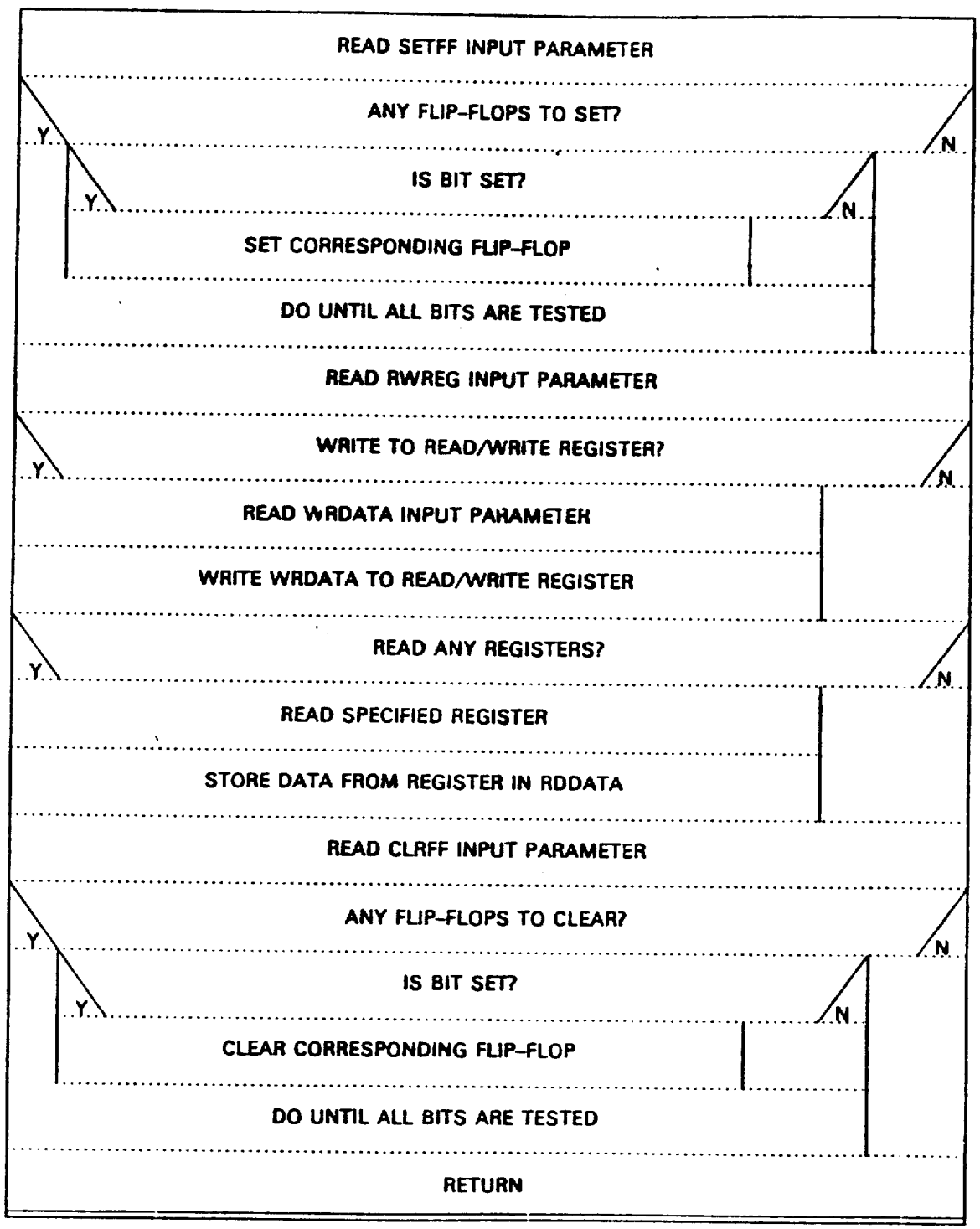
Figure O-9. PNL

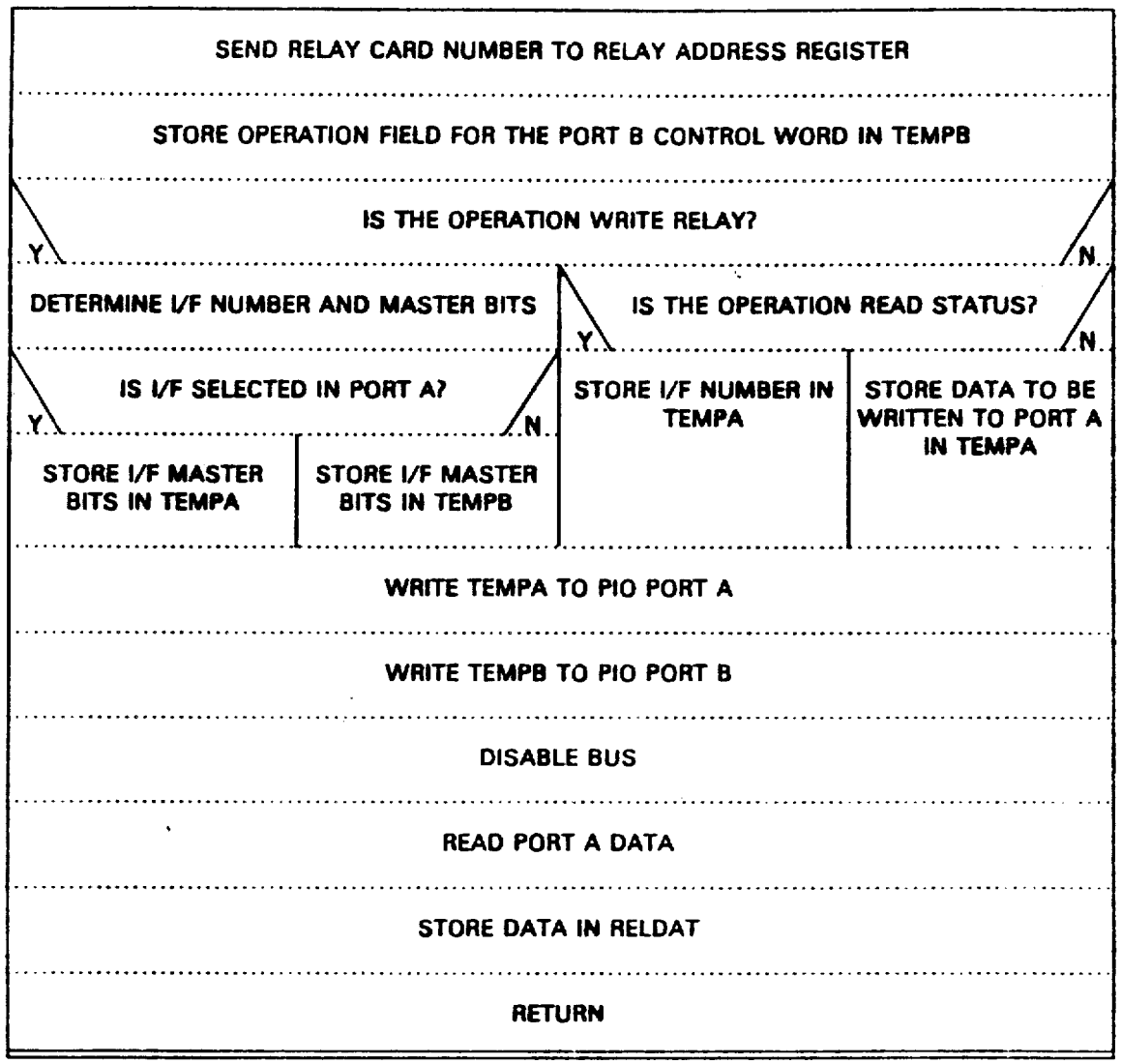
Figure O-10. RELAY

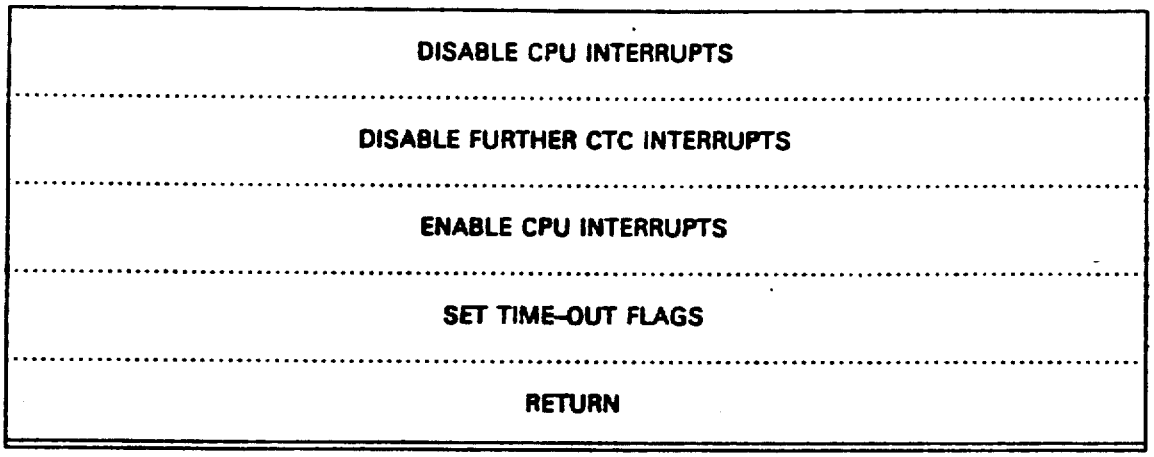
Figure O-11. TWINT
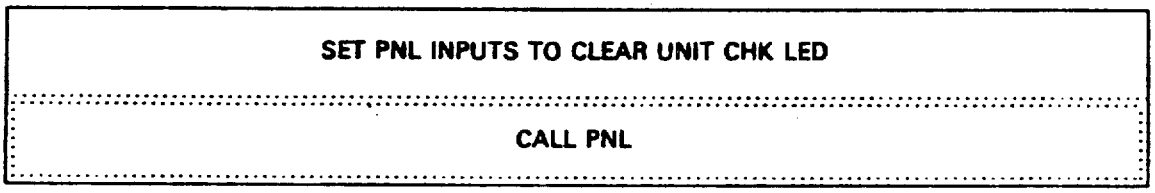
Figure O-12. LAMP TEST/RESET NMI
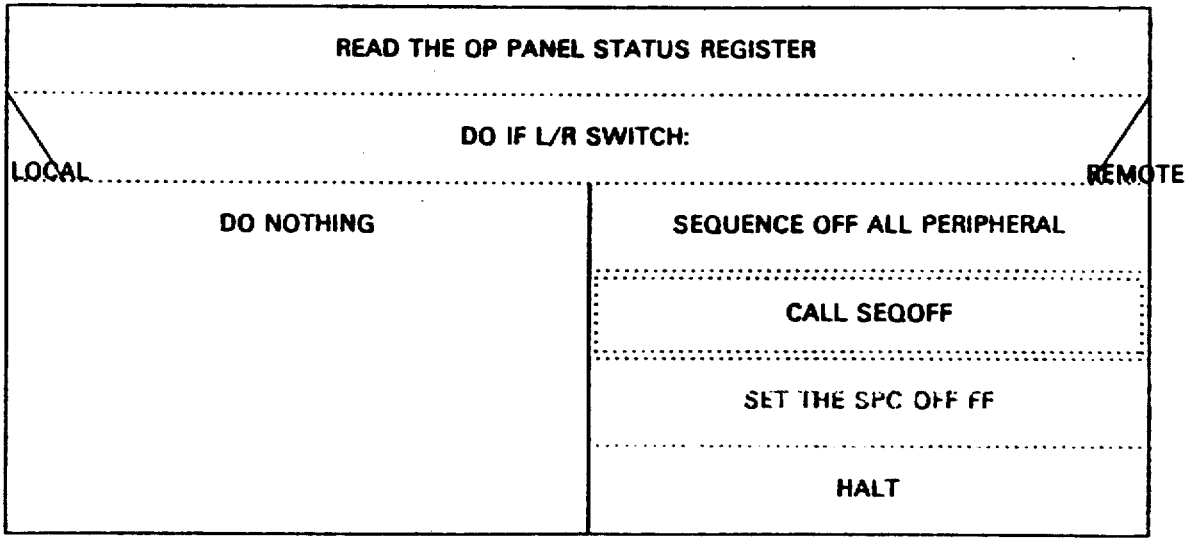
Figure O-13. FIPS-61 OFF NMI Figure O-14. LOCAL OFF NMI
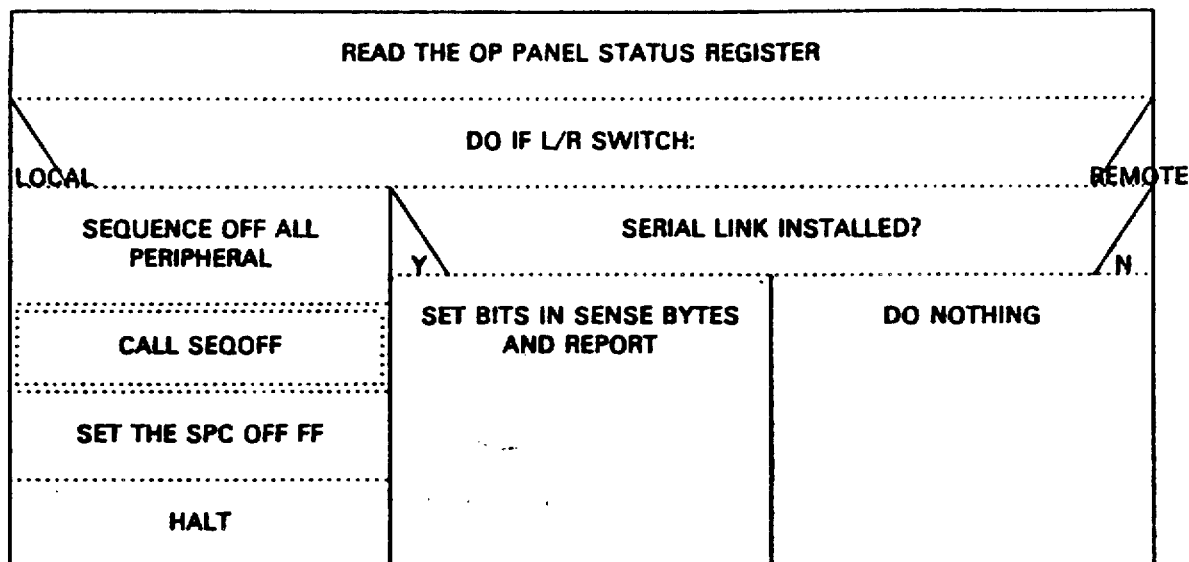
Figure O-15. AIR LOSS NMI
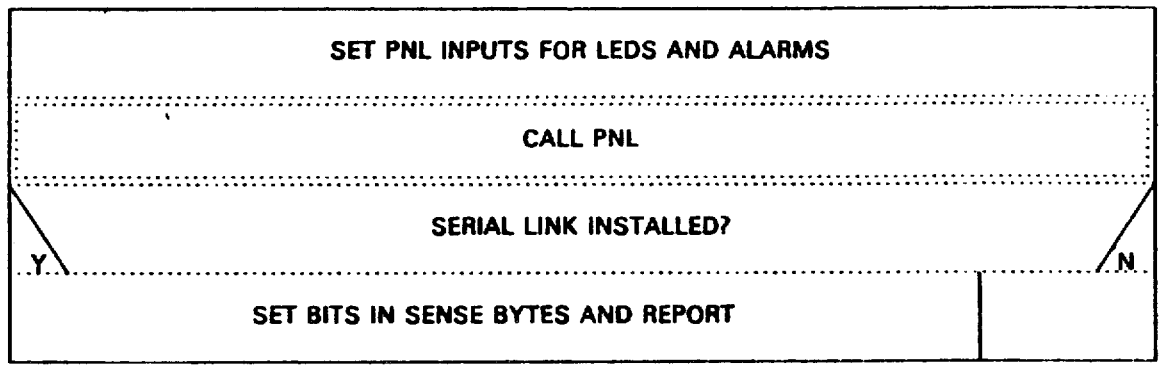
Figure O-16. HIGH TEMP NMI
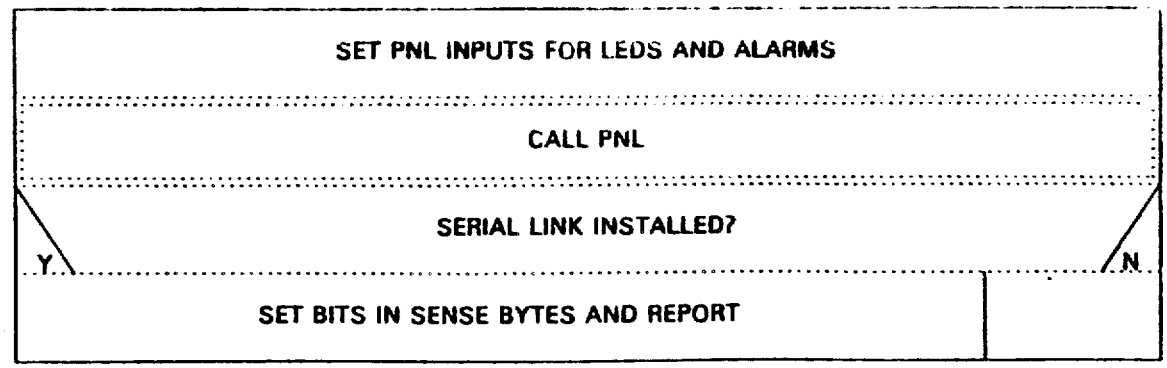

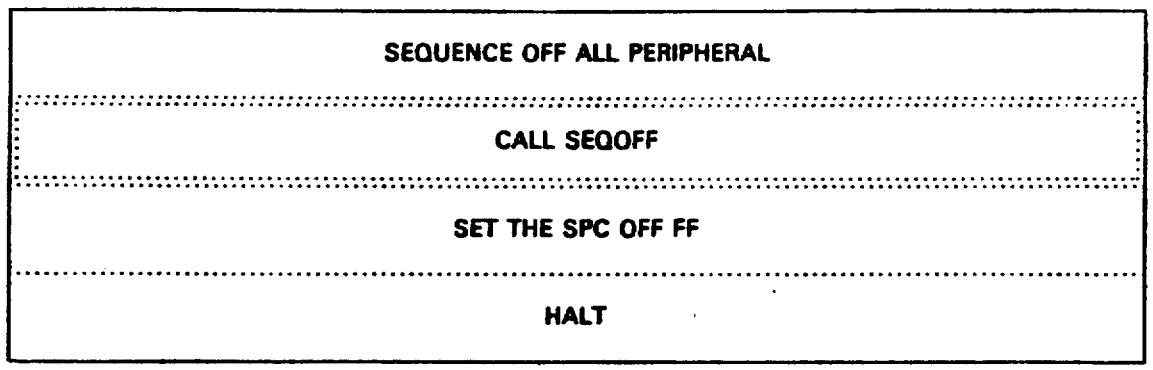
Figure O-17. OVER TEMP NMI
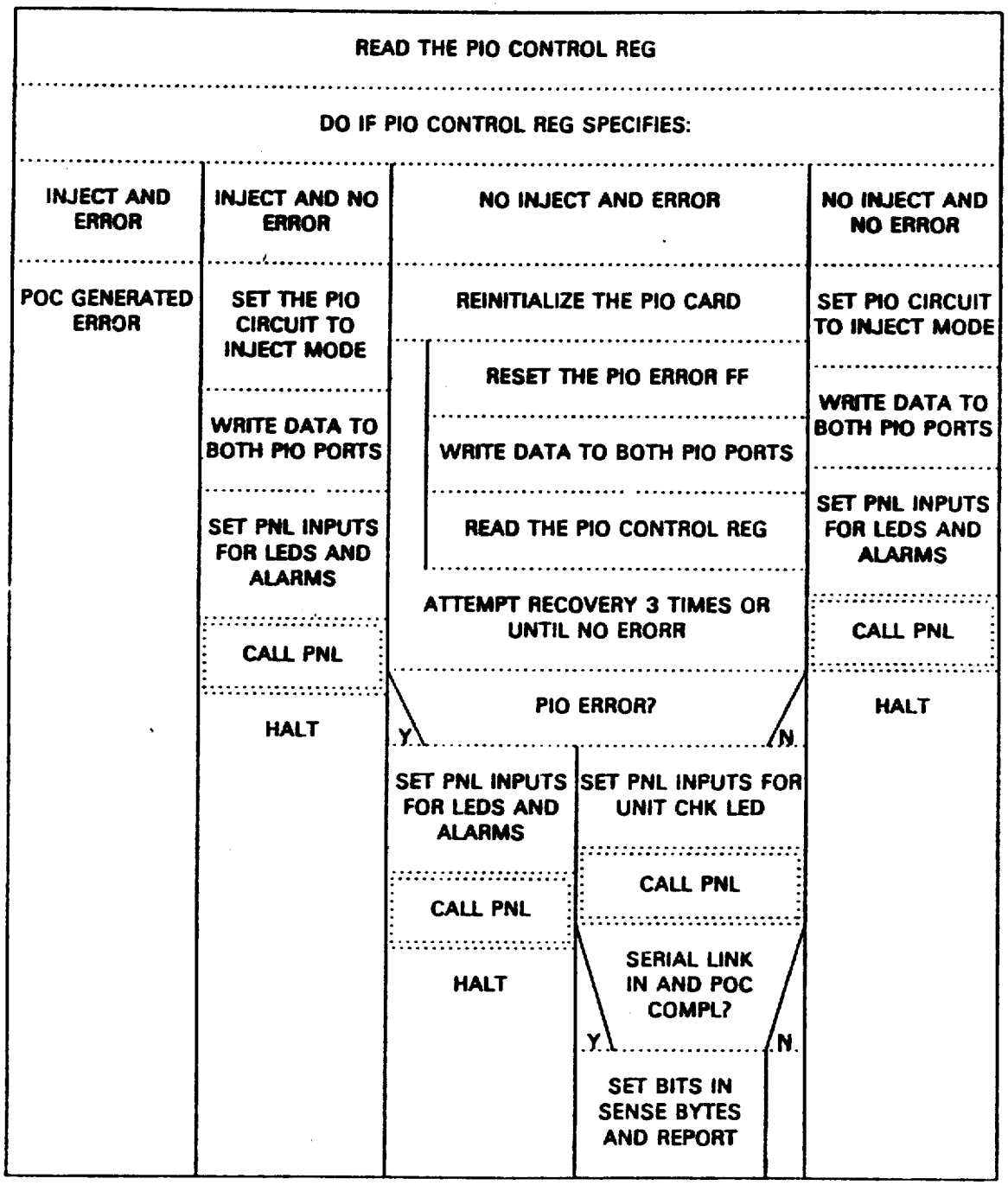
Figure O-18. PIO ERROR NMI

Figure O-19. PARITY ERROR NMI
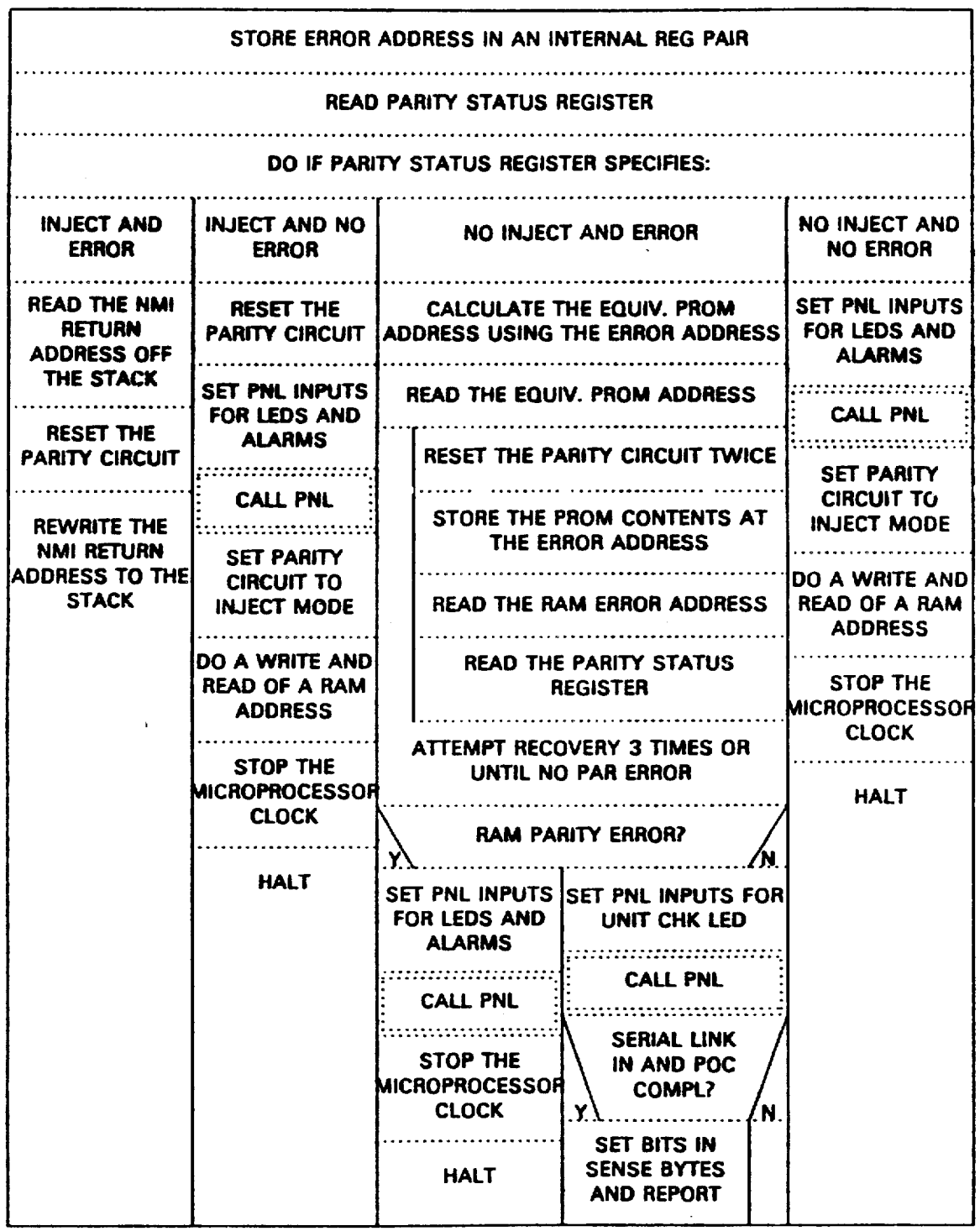

Figure O-20. NMI SERVICE ROUTINE

| EXCHANGE THE ACCUMULATOR-PSW REG PAIR WITH ALTERNATE REG PAIR ||||||||
|---|---|---|---|---|---|---|---|
| READ THE NMI REGISTER ||||||||
| DO FOR NMI REGISTER SPECIFYING: ||||||||
| LMP | FIP | OFF | AIRL | HT | OT | PIO | LPAR |
| see flowchart O-12 | see flowchart O-13 | see flowchart O-14 | see flowchart O-15 | see flowchart O-16 | see flowchart O-17 | see flowchart O-18 | see flowchart O-19 |
| EXCHANGE ALTERNATE ACC/PSW REG PAIR WITH MAIN REG PAIR ||||||||
| CLEAR THE NMI FLIP-FLOP ||||||||
| RETURN ||||||||

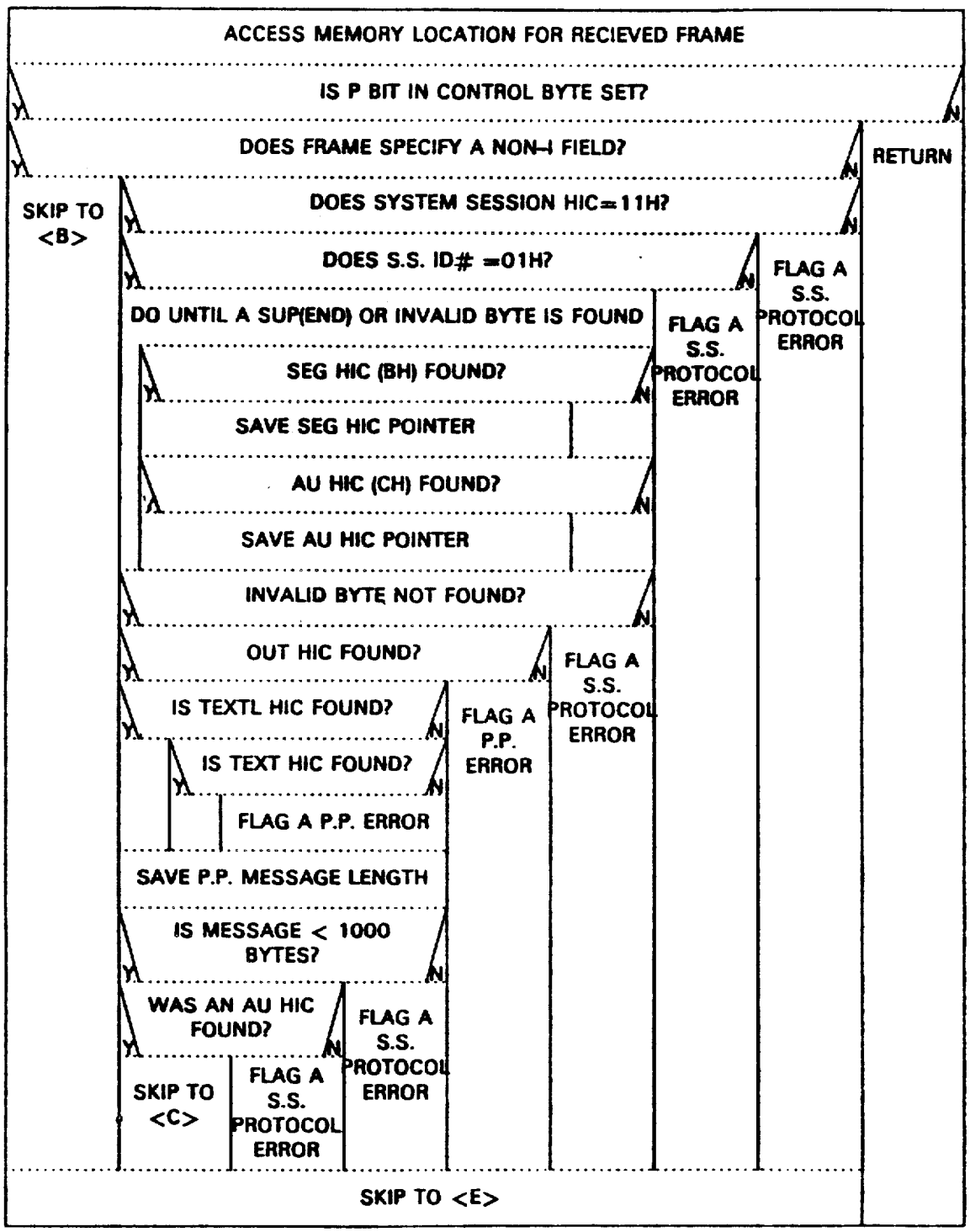
Figure O-21. FNCDEC

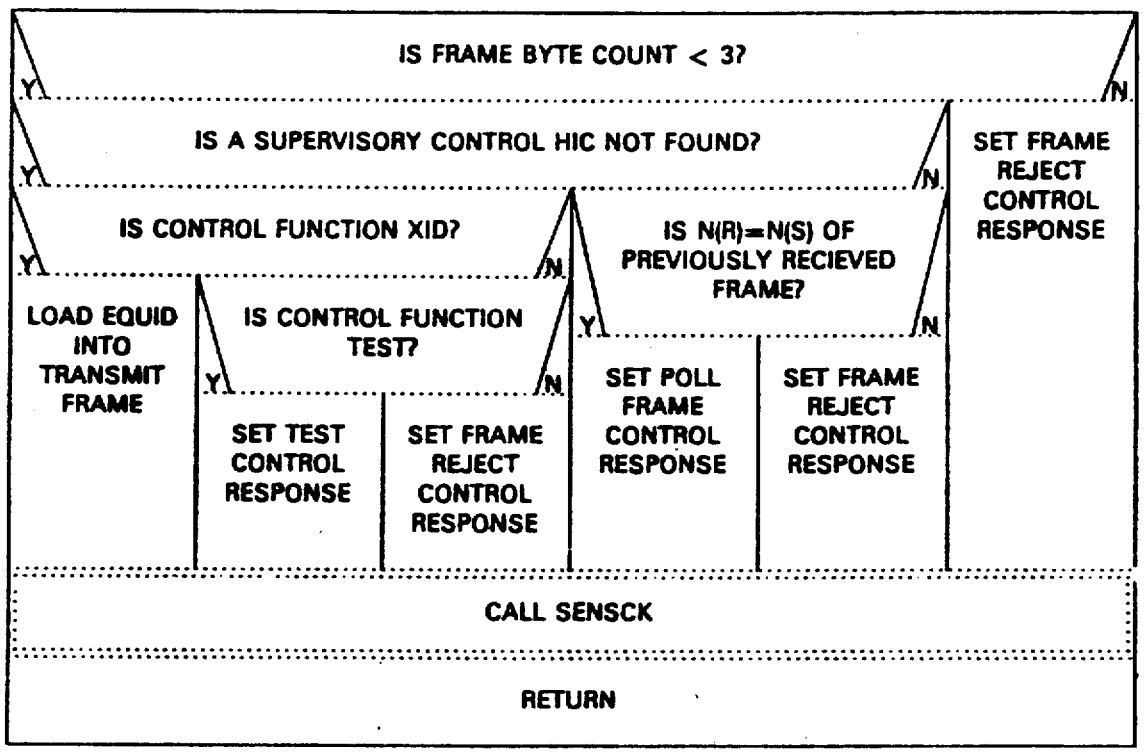
Figure O-22. FNCDEC

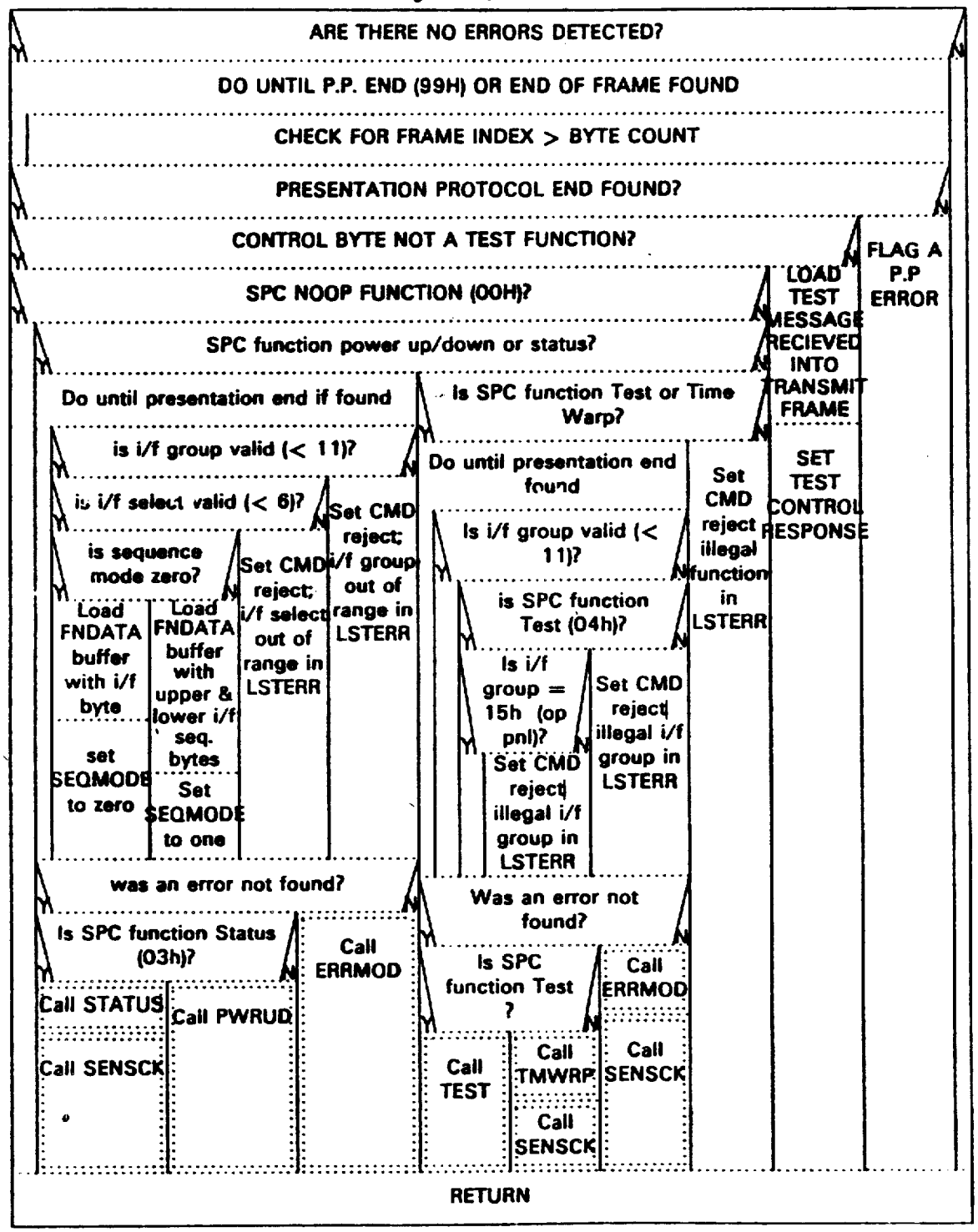
Figure O-23. FNCDEC

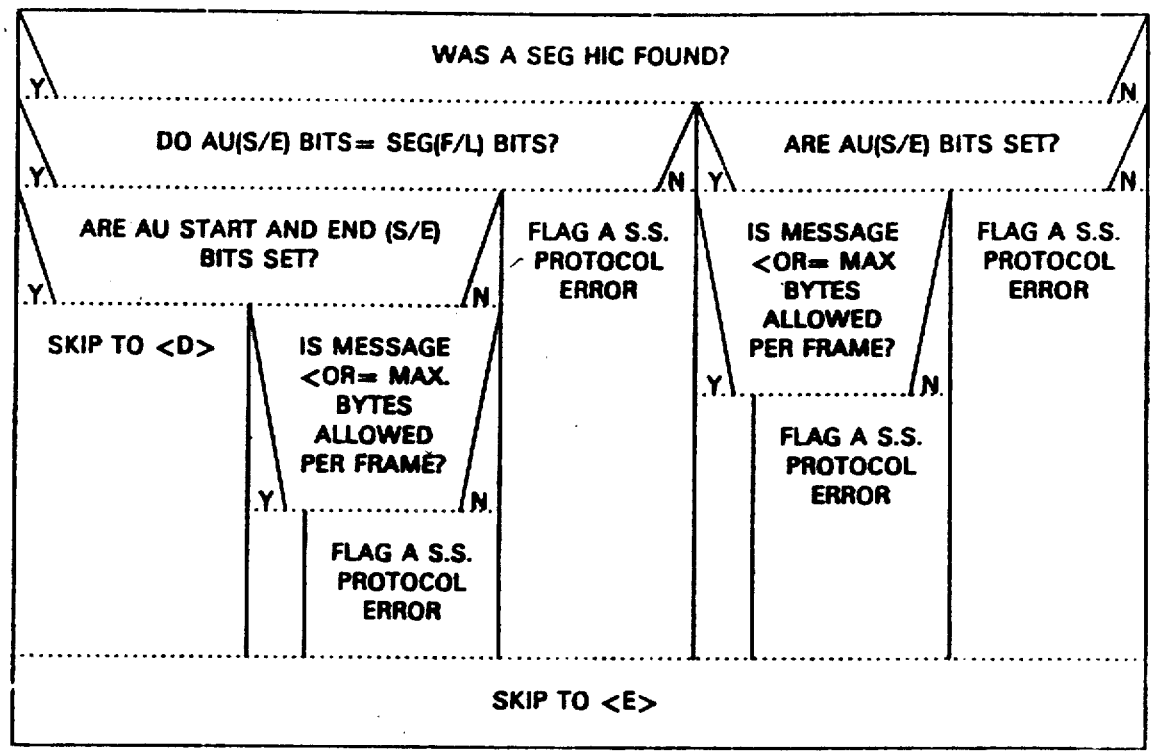
Figure O-24. FNCDEC

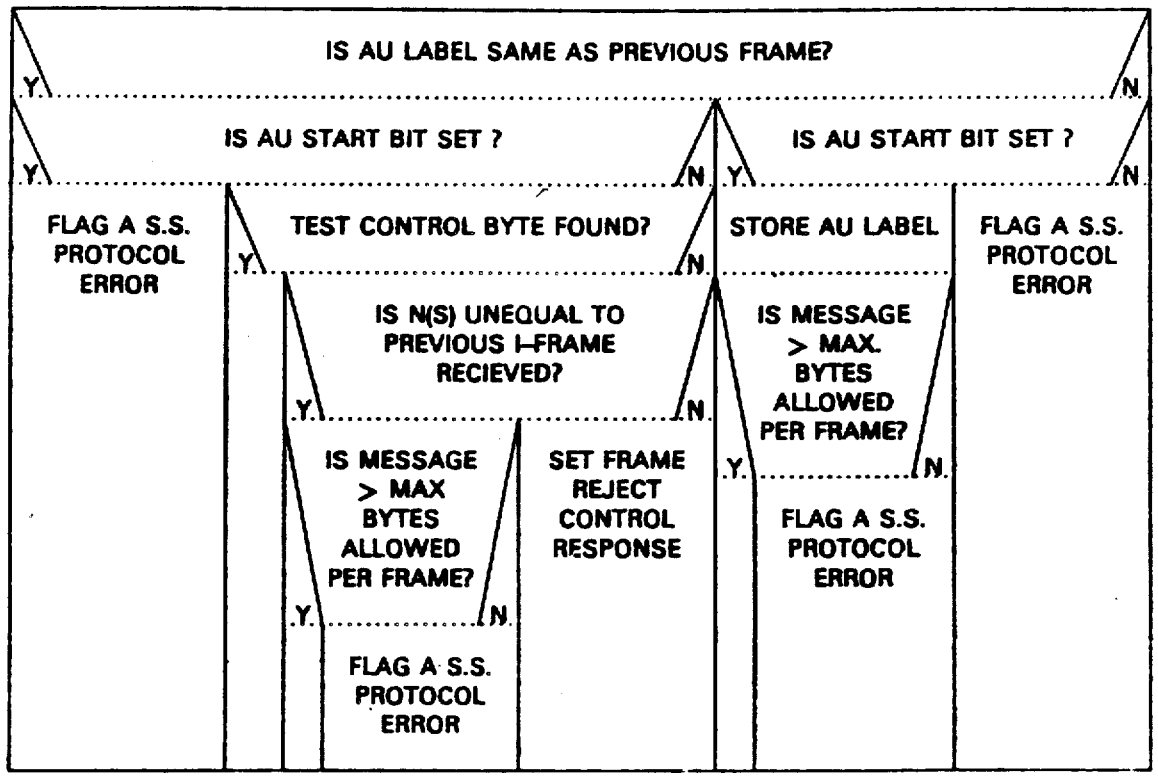
Figure O-25. FNCDEC

Figure O-26. PWRUD
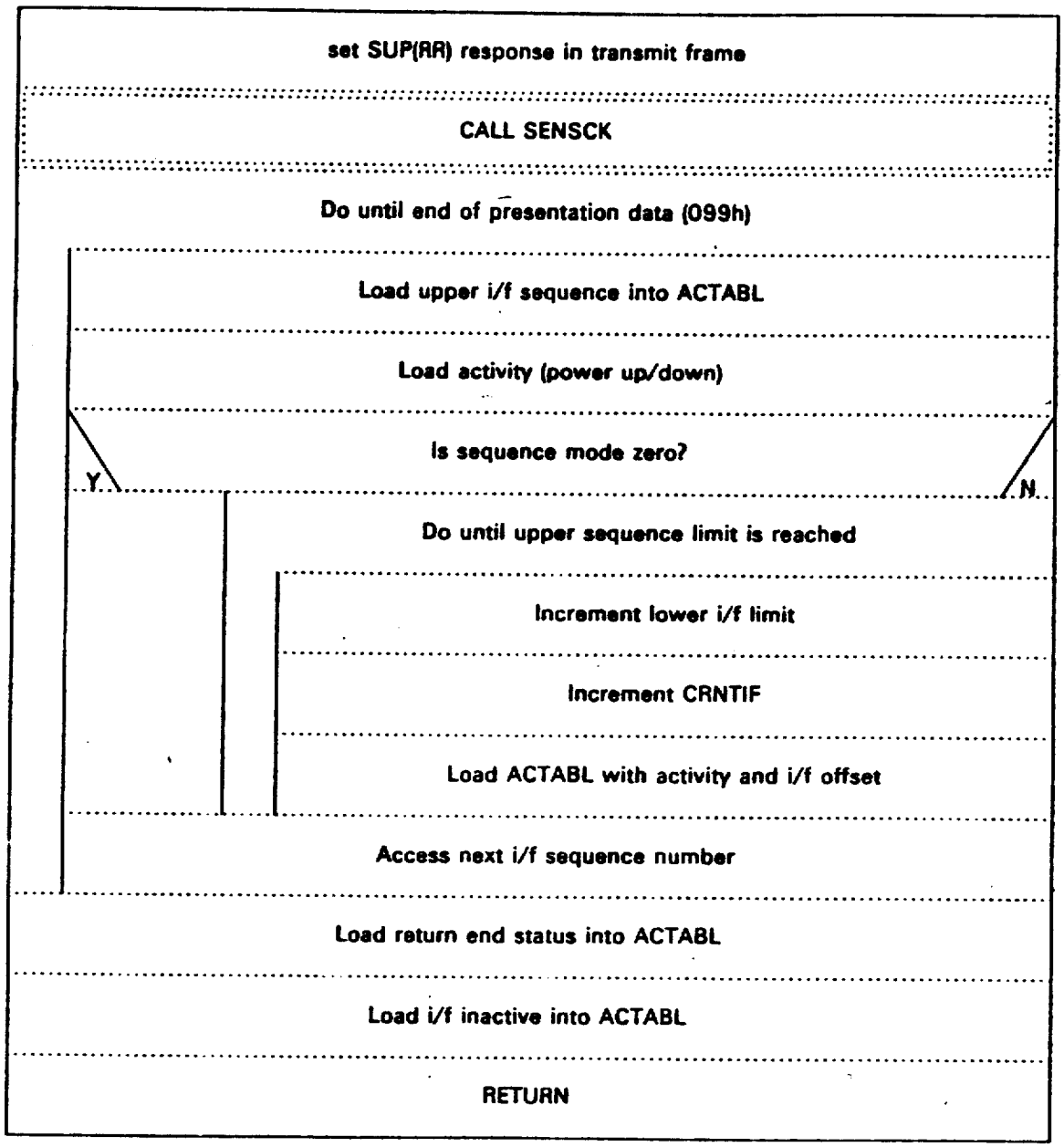

Figure O-27. STATUS
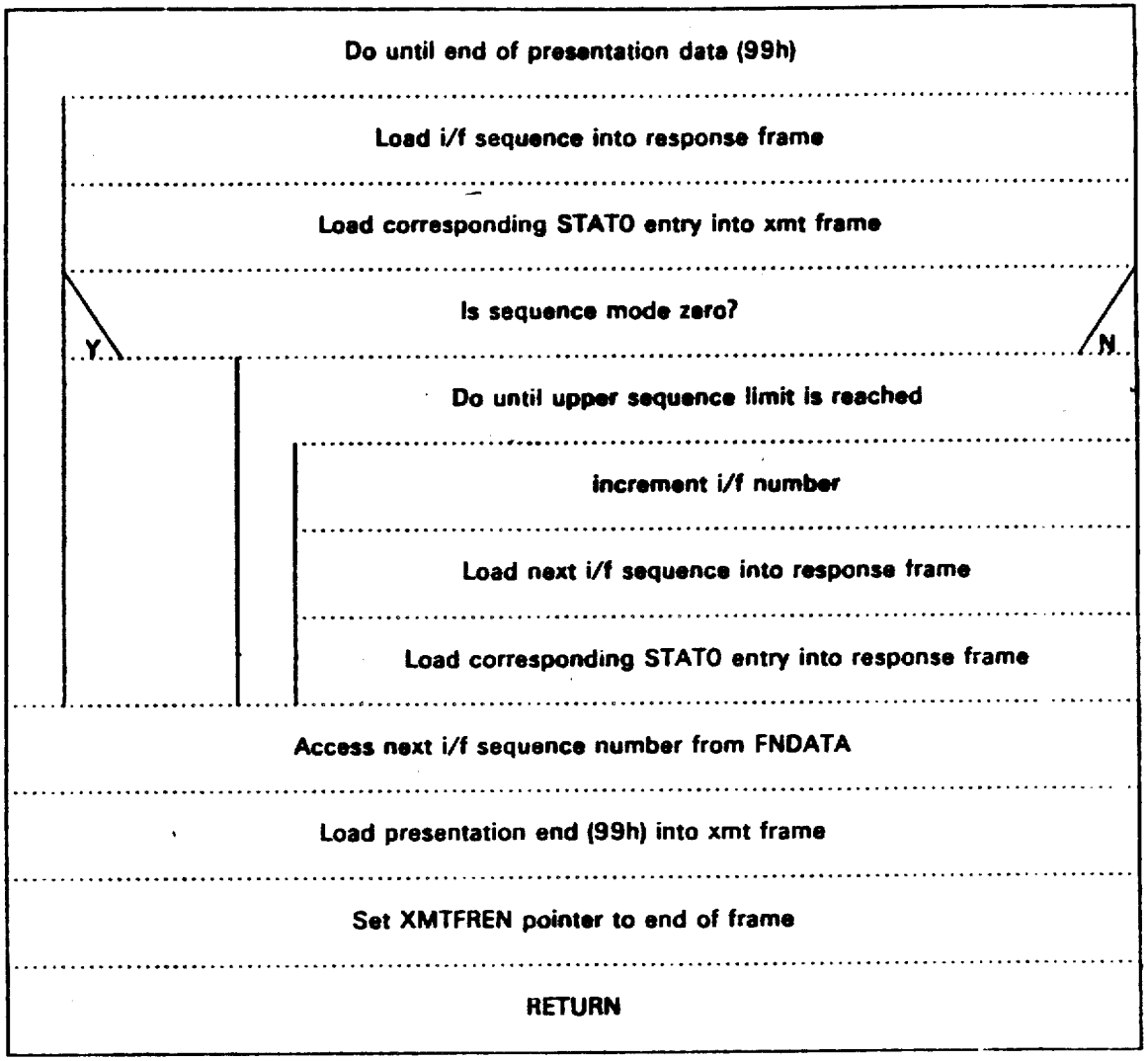

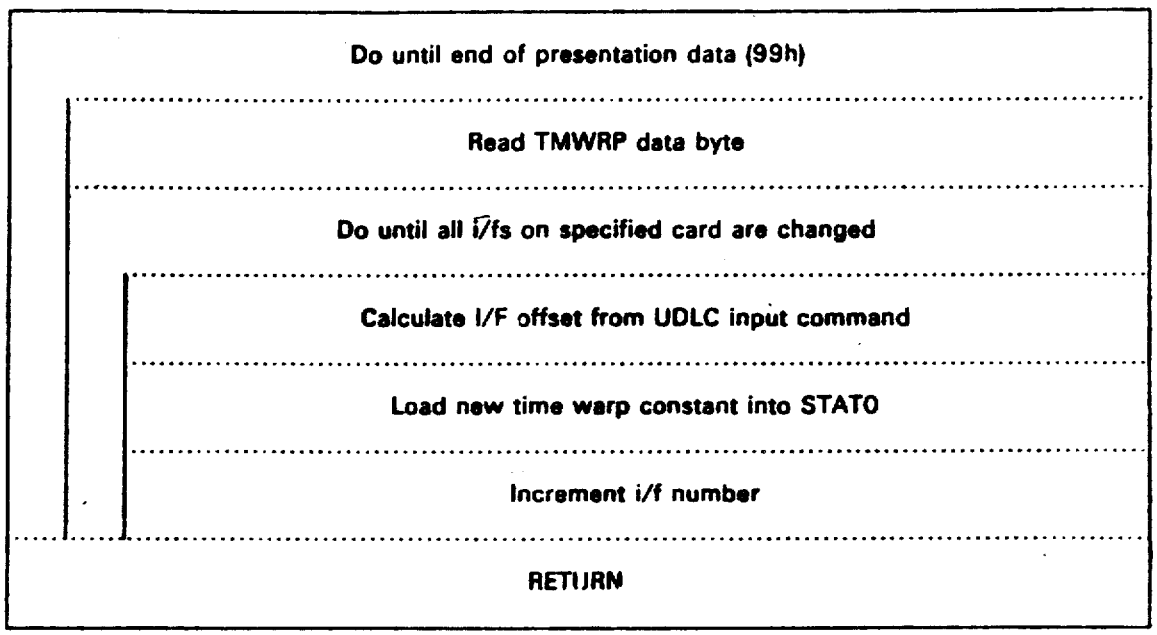
Figure O-28. TMWRP

Figure O-29. TEST
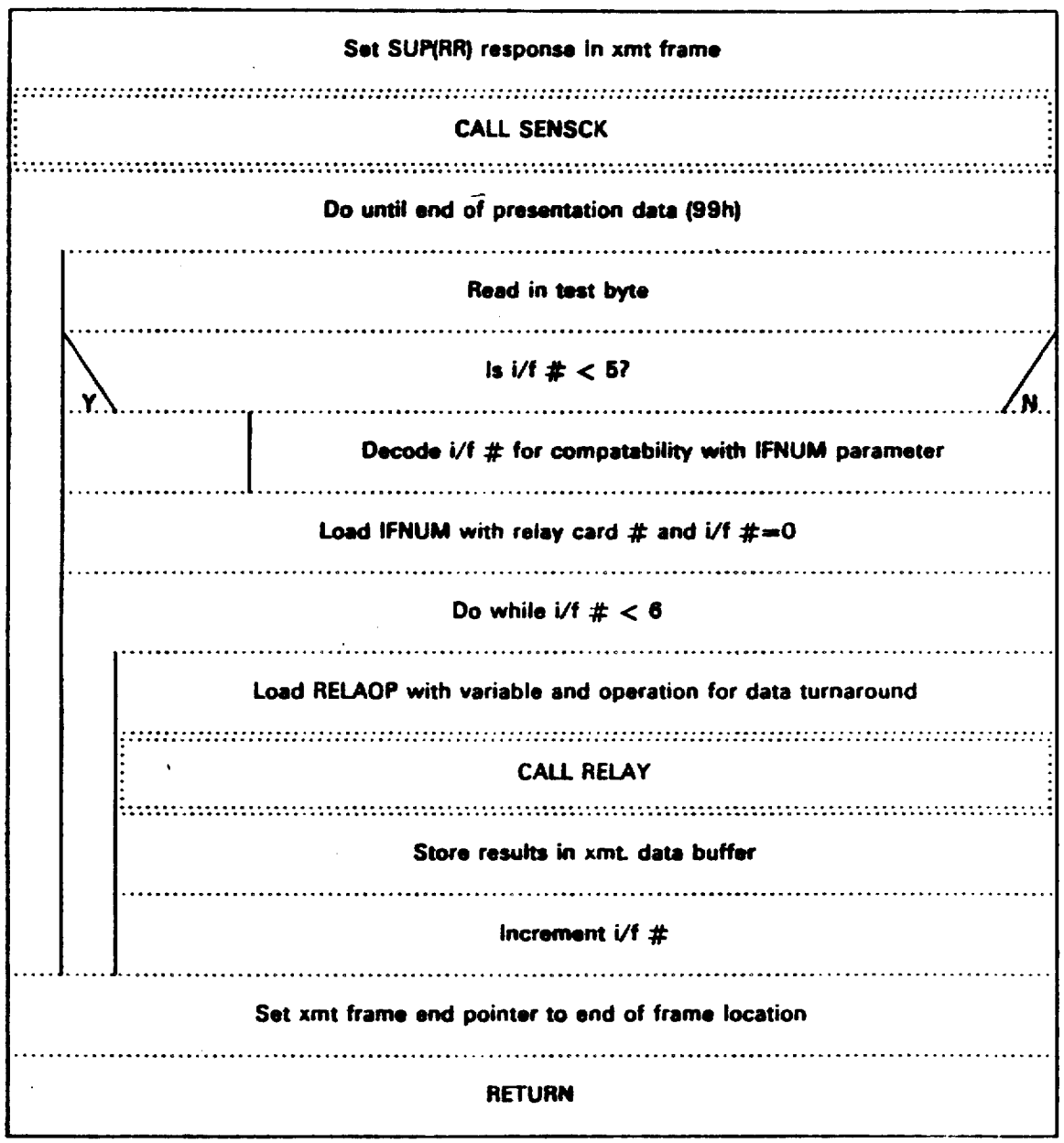

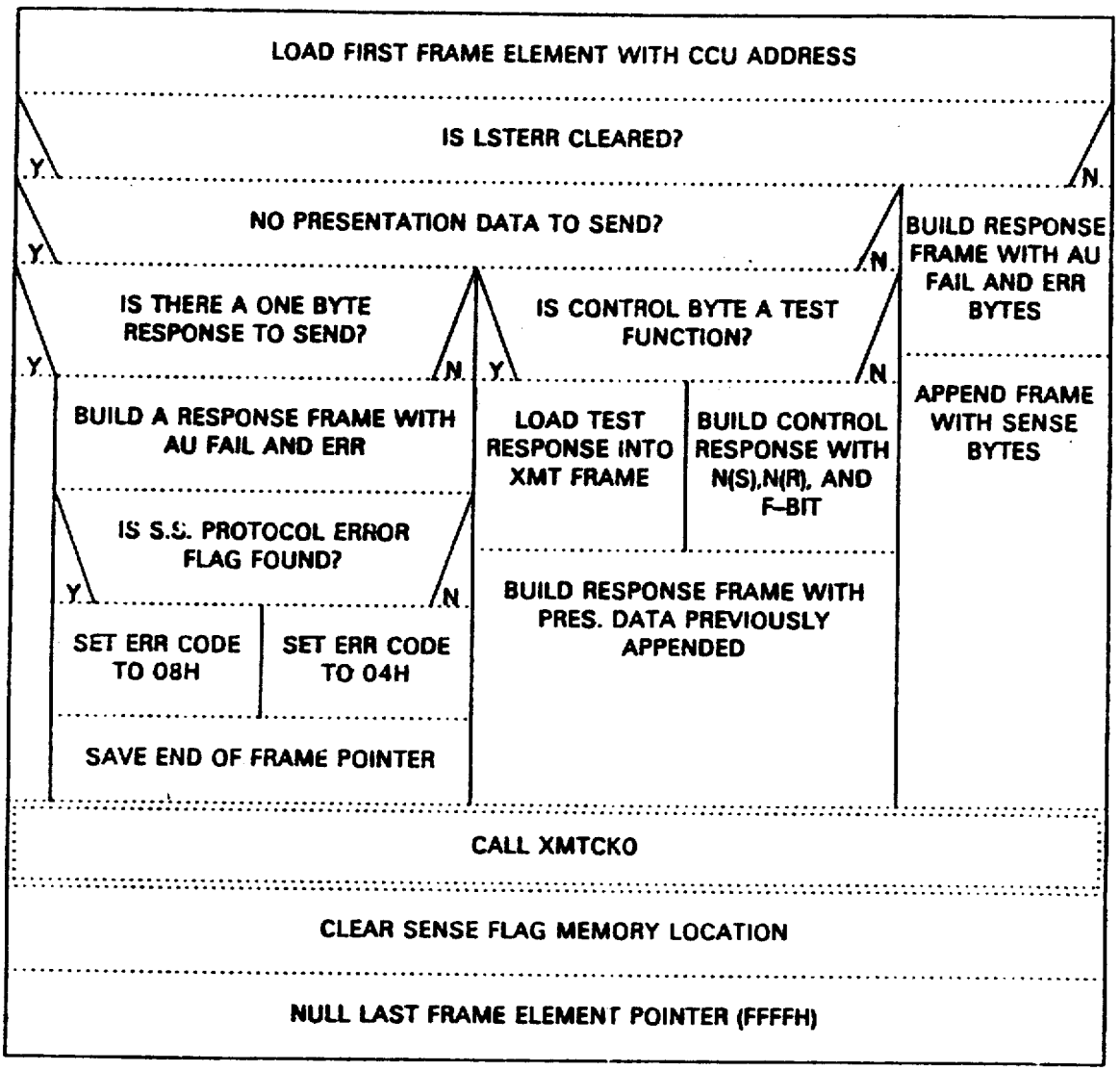

Figure O-30. SENSCK

What is claimed is:

1. A selective, automatic power control system for data processing equipment, said data processing equipment having a plurality of power controlling command sources connected to a plurality of controlled units via a plurality of interface connecting means, each of said interface connecting means comprising:

selective automatic power control means connected to said plurality of power controlling command sources to automatically activate power to elected ones of said controlled units when such activation is required by any one of said plurality of power controlling command source means of said data processing equipment and to automatically deactivate power to said selected controlled units when their performance is no longer required by said data processing equipment, and including status indicating means to report back such activation/deactivation status of each of the plurality of controlled units to each of the plurality of command sources to thereby conserve the electricity previously required to constantly maintain power to controlled units during time periods when their operative performance is not required by said data processing equipment, said selective automatic power control means further comprising:

(a) a common microcontroller bus;
(b) a main microcontroller coupled thereto for control thereof;
(c) an identical redundant microcontroller similarly coupled to said common microcontroller bus;
(d) a memory means also coupled to said bus to provide storage;
(e) a pair of parallel input/output means coupled to said bus to provide information to and from said bus;
(f) a power control means coupled between said bus and a power source;
(g) each of said parallel input/output means also having connected thereto a relay bus;
(h) a plurality of relay cards connected to each of said relay buses; and
(i) each of said relay cards having a plurality of power interfaces for individual connection to each of a plurality of peripheral control devices.

2. A selective automatic power control system for a configuration of multiple data processing systems, each of which data processing systems includes a plurality of power controlling command sources and one or more input/output processors, each input/output processor coupled to all of said power controlling command sources within one of said data processing systems comprising:
  (a) a plurality of selective automatic control means, each coupled to all of said plurality of power controlling command sources of said multiple data processing systems;
  (b) a common peripheral control unit coupled to all of said plurality of selective automatic control means;
  (c) a plurality of peripheral devices;
  (d) each of said plurality of selective automatic control means further comprising:
    (1) a common microcontroller bus;
    (2) a main microcontroller coupled thereto for control thereof;
    (3) an identical redundant microcontroller similarly coupled to said common microcontroller bus;
    (4) a memory means also coupled to said bus to provide storage;
    (5) a pair of parallel input/output means coupled to said bus to provide information to and from said bus;
    (6) a power control means coupled between said bus and a power source;
    (7) each of said parallel input/output means also having connected thereto a relay bus;
    (8) a plurality of relay cards connected to each of said relay buses; and
    (9) each of said relay cards having a plurality of power interfaces for individual connection to each of a plurality of peripheral control devices wherein selected peripheral devices are automatically activated and/or deactivated by commands received via said plurality of power controlling command sources to thereby conserve the electricity previously used to maintain power to non-selected controlled peripheral devices during inactive time periods.

3. A selective automatic power control system for controlling the operation of a plurality of peripheral devices of a data processing equipment comprising:
  (a) a master command source;
  (b) a system power controller connected thereto;
  (c) one or more command sources, all connected to said system power controller;
  (d) one or more subsystem power controllers each connected to each of said command sources;
  (e) said system power controller and each of said one or more subsystem power controllers all having a similar configuration, each comprising:
    (1) a common microcontroller bus;
    (2) a main microcontroller coupled thereto for control thereof;
    (3) an identical redundant microcontroller similarly coupled to said common microcontroller bus;
    (4) a memory means also coupled to said bus to provide storage;
    (5) a pair of parallel input/output means coupled to said bus to provide information to and from said bus;
    (6) a power control means coupled between said bus and a power source;
    (7) each of said parallel input/output means also having connected thereto a relay bus;
    (8) a plurality of relay cards connected to each of said delay buses; and
    (9) each of said relay cards having a plurality of power interfaces for individual connection to each of a plurality of peripheral control devices, wherein selected peripheral devices of the plurality of peripheral devices of said data processing equipment are automatically activated and/or deactivated by commands received from said system power controller and/or from one of said one or more subsystem power controllers to thereby conserve the electricity previously used to maintain power to non-selected peripheral devices during inactive time periods.

4. A selective automatic power controller comprising:
  (a) a common microcontroller bus;
  (b) a main microcontroller coupled thereto for primary control thereof;
  (c) an identical redundant microcontroller also coupled to said common microcontroller bus, by an electrically isolated interconnection means, to simultaneously perform the same function as said main microcontroller;
  (d) clock logic means commonly coupled to said main and said redundant microcontrollers to concurrently provide clock signals thereto;
  (e) a comparison means connected between the main and redundant microcontrollers to provide an error generation signal to said clock logic means, which error generation signal causes the concurrently provided clock signals thereto to cease when inequality exists between said microcontrollers;
  (f) a memory means also coupled to said common microcontroller bus to provide storage;
  (g) a pair of parallel input/output means also coupled to said common microcontroller bus to provide information to and from said bus;
  (h) a power control means coupled between said common microcontroller bus and a power source;
  (i) each of said pair of parallel input/output means having respectively connected thereto a relay bus;
  (j) a plurality of relay cards connected to each of said relay busses; and
  (k) each of said relay cards having a plurality of power interfaces for individual connection to each of a plurality of peripheral control devices.

* * * * *